US008616028B2

(12) United States Patent
Kim et al.

(10) Patent No.: US 8,616,028 B2
(45) Date of Patent: Dec. 31, 2013

(54) STATOR FOR BLDC MOTOR AND BLDC MOTOR HAVING THE STATOR, POWER TRANSMISSION DEVICE FOR WASHING MACHINE, DRIVING DEVICE FOR WASHING MACHINE AND FULL AUTOMATIC WASHING MACHINE USING THE SAME

(75) Inventors: Byoung Kyu Kim, Seoul (KR); Kyu Hyuk Jeong, Gyeonggi-do (KR); Jong Hoon Lee, Incheon (KR)

(73) Assignee: Amotech Co., Ltd., Incheon (KR)

( * ) Notice: Subject to any disclaimer, the term of this patent is extended or adjusted under 35 U.S.C. 154(b) by 942 days.

(21) Appl. No.: 12/450,626

(22) PCT Filed: Apr. 8, 2008

(86) PCT No.: PCT/KR2008/001977
§ 371 (c)(1),
(2), (4) Date: Oct. 2, 2009

(87) PCT Pub. No.: WO2008/123735
PCT Pub. Date: Oct. 16, 2008

(65) Prior Publication Data
US 2010/0050702 A1     Mar. 4, 2010

(30) Foreign Application Priority Data

Apr. 10, 2007  (KR) .......................... 10-2007-0035294

(51) Int. Cl.
*D06F 21/00*     (2006.01)
(52) U.S. Cl.
USPC .......................................................... 68/140
(58) Field of Classification Search
USPC ............................. 68/23 R, 140, 12.16, 12.24
See application file for complete search history.

(56) References Cited

U.S. PATENT DOCUMENTS 4,220,879 A * 9/1980 Hoshimi et al. ............. 310/68 R
4,232,536 A * 11/1980 Koseki et al. ................. 68/12.16
(Continued)

FOREIGN PATENT DOCUMENTS

JP      10-127973      5/1998
KR  10-2004-0071402   8/2004
(Continued)

OTHER PUBLICATIONS

Machine Translation of Kim, KR1020040071420, Aug. 2004.*

*Primary Examiner* — David Cormier
(74) *Attorney, Agent, or Firm* — Rosenberg, Klein & Lee

(57) ABSTRACT

Provided is a driving device for a full automatic washing machine in which a clutch unit can stop rotation of a dehydration axis without having a particular brake unit, since the clutch unit is closely adhered to a first dehydration axis and a bushing when the rotation of the dehydration axis is controlled according to a wash or dehydration stroke in a full automatic washing machine. In addition, since a clutch coupler of the clutch unit moves at a wash or dehydration stroke in a driving device of a washing machine to thus be attached to and detached from a clutch gear which controls rotation of the first dehydration axis, and to thereby control a rotational force which is transferred to an inner tub, the washing machine is embodied to have a simple clutch coupling structure. Further, a double-rotor and a single-stator of a brushless direct-current (BLDC) motor which is applied to a driving device of a washing machine are insert-molded into a waterproof structure, to thus maximize a contact area of a bulk molding compound (BMC) molding material to thereby maximize durability.

9 Claims, 15 Drawing Sheets

(56) References Cited

U.S. PATENT DOCUMENTS

| | | | | |
|---|---|---|---|---|
| 4,504,755 | A | * | 3/1985 | Semones et al. ......... 310/156.47 |
| 5,226,855 | A | | 7/1993 | Van Lierde |
| 6,756,713 | B2 | * | 6/2004 | Diehl et al. ................... 310/71 |
| 2002/0067094 | A1 | * | 6/2002 | Okazaki et al. ............... 310/180 |
| 2004/0245878 | A1 | * | 12/2004 | Kim et al. .................... 310/114 |
| 2005/0029882 | A1 | * | 2/2005 | Liu et al. ....................... 310/91 |

FOREIGN PATENT DOCUMENTS

| | | |
|---|---|---|
| KR | 10-2004-0071420 | 8/2004 |
| KR | 20-2004-0104979 | 12/2004 |
| KR | 10-2005-0000245 | 1/2005 |
| KR | 10-2005-0113452 | 12/2005 |
| KR | 10-0606749 | 7/2006 |
| WO | WO 2006083083 A2 * | 8/2006 |

* cited by examiner

STATOR FOR BLDC MOTOR AND BLDC MOTOR HAVING THE STATOR, POWER TRANSMISSION DEVICE FOR WASHING MACHINE, DRIVING DEVICE FOR WASHING MACHINE AND FULL AUTOMATIC WASHING MACHINE USING THE SAME

TECHNICAL FIELD

The present invention relates to a power transmission device of a washing machine, a driving device for a washing machine and a full automatic washing machine using the power transmission device, and more particularly, to a stator for a brushless direct-current (BLDC) motor, a BLDC motor using the stator, a power transmission device for a washing machine, a driving device for a washing machine and a full automatic washing machine using the power transmission device, in which a clutch unit can stop rotation of a dehydration axis without having a particular brake unit, when the rotation of the dehydration axis is controlled according to a wash/rinse/dehydration stroke in the full automatic washing machine.

BACKGROUND ART

Generally, washing machines are electronic home appliances which remove pollutant and dirty of clothes and bedclothes using emulsification of a cleaning material and friction and impact of a water current by rotation of wash blades. An ordinary washing process in the washing machine includes a wash/rinse/dehydration stroke and a water supply/discharge stroke.

Washing machines are classified into a pulsator washing machine and a drum washing machine according to a wash mode. In the case of the pulsator washing machine, an inner tub is separated from a pulsator which is installed in the lower portion of the inner tub. In the case of wash and rinse strokes, only the pulsator rotates at a state where the inner tub has stopped, to thus cause a rotating water current, and in the case of a dehydration stroke, the pulsator and the inner tub rotate together.

In the case of an initial full automatic washing machine, an inner tub having a number of dehydration holes is rotatably installed in the inside of an outer tub which is installed in a case forming an external contour, a pulsator is rotatably installed in the lower-center of the inner tub, and a driving device having a clutch and a motor for making the inner tub and the pulsator is installed in the lower portion of the outer tub.

In such a full automatic washing machine, the motor is installed in one side of the lower portion of the outer tub, the clutch for controlling a rotational force of the motor is installed in one side of the motor, pulleys are combined with the lower ends of the axes of the motor and the clutch, respectively, and a belt is linked between the pulleys. Accordingly, the rotational force of the motor is transferred to the clutch via the belt, and the clutch controls the rotational force of the motor according to the respective strokes of the washing machine. As a result, the pulsator and/or the inner tub are made to rotate.

Thus, the driving device of the washing machine having the above-described structure has problems that driving the power decelerates when the rotational force of the motor is transferred to the dehydration axis and the wash axis which make the inner tub and the pulsator, and that concentricity of the inner tub occurs since the motor is attached on the side of the clutch.

In order to solve the problem that the concentricity of the inner tub occurs, an inner rotor style motor is attached not on the side of the clutch but on the lower end of the clutch. Accordingly, the problem that the inner tub is concentric has been solved. However, since a washing machine which is longer by length of the inner rotor style motor than that of a conventional washing machine, a problem that the washing machine becomes huge still remains.

Therefore, as disclosed in the Korean Laid-open Publication No. 2004-71420, an outer rotor style brushless direct-current motor (hereinafter, referred to as "BLDC motor") is connected directly to the lower side of a clutch, to accordingly provide a driving device of a washing machine which prevents concentricity of an inner tub and size of the washing machine from being enlarged, and increases output of a drive motor of the washing machine.

However, the driving device of the washing machine which is disclosed in the Korean Laid-open Publication No. 2004-71420 is hard to satisfy a high power which is required in a high-capacity full automatic washing machine since the driving device has a single-rotor/single-stator structure as the outer rotor style BLDC motor. In addition, malfunction or breakdown of the motor may occur due to leakage of water in the washing machine.

In addition, a clutch assembly that controls rotation of a dehydration axis that rotates the inner tub at the dehydration stroke of the washing machine, emancipates a sliding coupler to thus intercept the rotational force from being applied to the dehydration axis, and makes the wash axis and dehydration axis integrally rotate at the wash/rinse strokes. As a result, components of the clutch assembly becomes complicated, and a brake assembly that disrupts rotation of the dehydration axis should be separately provided.

Further, an outer rotor style BLDC motor applied to a washing machine is disclosed in the U.S. Pat. No. 5,226,855. Here, in a drive system of the washing machine disclosed in the U.S. patent, a spin tub which is an inner tub is placed within a container which is an outer tub, and the spin tub and an agitator rotate by buoyancy of the wash water in the container at a state where the agitator is located at the center of the spin tub. That is, teeth of toothed wheels are freed by buoyancy of the wash water in the container, and thus the spin tub and the agitator freely rotate to thereby make the washing machine perform a wash stroke. In this case, if no wash water exists in the washing machine, the teeth of the toothed wheels are engaged with each other, to thus make the spin tub and the agitator simultaneously rotate and make the washing machine perform a dehydration stroke.

In the drive system of the washing machine disclosed in the U.S. patent, a coupling structure of the inner and outer rotating axes and the toothed wheels is complex since the agitator and the spin tub are made to rotate according to whether or not the wash water exists in the container. Further, since no gear unit that amplifies the rotational force that is generated from an outer rotor style BLDC motor is provided in the U.S. patent, the rotational force that is transferred to the agitator and the spin tub is not been properly controlled.

Therefore, a washing machine which may simplify a coupling structure between a wash axis which rotates a pulsator and a dehydration axis which rotates a spin tub and which may control the pulsator and the spin tub to selectively rotate, should be proposed.

Further, the inner rotor style motor has shortcoming that a gear ratio of a gear unit which transfers the rotational force of the motor should be high since the instantaneous torque of the inner rotor style motor is low. Meanwhile, the outer rotor style motor can reduce a gear ratio of the gear unit relatively, since the outer rotor style motor has a torque higher than the inner rotor style motor.

Thus, if an outer rotor style motor is applied to a washing machine, the ratio gear of the gear unit can be reduced in comparison with the case that an inner rotor style motor is applied thereto. However, the washing machine employing the outer rotor style motor does not satisfy high power of a large-capacity washing machine. Accordingly, a driving device of a washing machine which can satisfy high power of the large-capacity washing machine, and further reduce the ratio gear of the gear unit is required.

According to a BLDC motor of a double-rotor structure, permanent magnets are arranged at the inner and outer sides of a division type core, and accordingly a flow of magnetic flux in a magnetic circuit is formed by a yoke of the inner and outer side permanent magnets and a rotor. Thus, it is possible to perfectly divide the division type core. As a result, the double-rotor structure BLDC motor has a structure of greatly heightening productivity of the division type core and power of the motor by individual coil windings.

As described above, when a division type core is employed in a stator, a general-purpose winding machine can be used for coil-winding individual cores. Accordingly, an initial investment expense for preparing for such a general-purpose winding machine is very inexpensive in comparison with the case of an integral type core structure that uses an expensive dedicated winding machine. However, a new stator assembly structure which can effectively assemble a stator when a number of individual cores are assembled into an integral type to thus mutually connect coils, is required.

That is, a structure of arranging and fixing many division type core assemblies on a printed circuit board (PCB) to then connect coils, and a specific coupling structure of a double-rotor are required. Accordingly, in order to improve an assembly of a division type stator core through the Korean Patent Laid-open Publication No. 2005-245, a stator structure and a BLDC motor using the stator structure was proposed by the same applicant as that of the present invention, in which a number of stator core assemblies are automatically positioned in and fixed to an annular core support, so as to be connected with divided coil.

By the way, the core holder essentially requires for an insert molding process of integrally forming a pair of guide flanges and/or a number of coupling protrusion pairs which are necessary for automatically positioning a division type core assembly in a PCB for connection of an annular band structure having a number of conduction lines and bonding pads which are necessary for mutually connecting coil on the lower surface of the core holder.

Moreover, the core holder has a structure that a number of the division type core assemblies are temporarily assembled in an annular plate formed of the PCB and the pair of the guide flanges, to thereby attain a bulk molding compound (BMC) molding. However, since the BMC molding material has a feature that mutual coherence for the PCB annular plate is weak, a stator holder enclosing the upper and lower surfaces of the PCB has a small contact area between the upper/lower portions of the PCB. Accordingly, there is a problem that coherence is weak.

Therefore, when a stator of a BLDC motor of a double structure is insert-molded, a contact area of a BMC molding material should be maximized to thus maximize durability of a stator.

DISCLOSURE

Technical Problem

To solve the above problems, it is an object of the present invention to provide a driving device for a washing machine and a full automatic washing machine using the same, in which a clutch unit can stop rotation of a dehydration axis without having a particular brake unit, when the rotation of the dehydration axis is controlled according to a wash/rinse/dehydration stroke in the full automatic washing machine.

It is another object of the present invention to provide a driving device for a washing machine and a full automatic washing machine using the same, in which a coupling structure of a pair of axes which rotate an inner tub and a pulsator at a wash or dehydration stroke of the full automatic washing machine, that is, a coupling structure of a wash axis and a dehydration axis is simple, and a rotational force generated from a brushless direct-current (BLDC) motor is controlled by a gear unit to then be transferred to the wash axis and the dehydration axis.

It is another object of the present invention to provide a driving device for a washing machine and a full automatic washing machine using the same, which includes a brushless direct-current (BLDC) motor of double-rotor/single-stator structure in which a double-rotor and a single-stator of the BLDC motor applied to the driving device of the full automatic washing machine are insert-molded so as to be manufactured into a waterproof structure, and a contact area of a bulk molding compound (BMC) molding material is maximized to thus maximize durability of a stator.

It is another object of the present invention to provide a stator for a brushless direct-current (BLDC) motor and a brushless direct-current (BLDC) motor using the stator, in which a printed circuit board (PCB) for an assembly which automatically positions a number of division type core assemblies is used to thus enhance productivity of a stator, a contact area of a bulk molding compound (BMC) molding material is maximized to thus maximize durability of a stator and reduce a torque ripple and a cogging torque, and a Hall sensor is accurately positioned at a set position, to thus avoid occurrence of deflection of a detection signal.

Technical Solution

To accomplish the above object of the present invention, according to an aspect of the present invention, there is provided a driving device for a full automatic washing machine having an inner tub and a pulsator which is rotatably combined in the inner tub, the driving device comprising: a brushless direct-current (BLDC) motor that produces a rotational force that rotates the pulsator and the inner tub; a first wash axis which is fixedly combined with a rotor support frame that is extended from a rotor of the BLDC motor so as to rotate; a second wash axis whose one side is linked with the pulsator, and through the other side of which the rotational force is received from the first wash axis, to thus make the pulsator rotate in a forward/reverse direction; a first dehydration axis which is coaxially combined on the outer circumference of the first wash axis, and which is supported to the rotor support frame so as to rotate; a second dehydration axis whose one side is connected with the inner tub, and through the other side of which the rotational force is received from the first dehydration axis, to thus make the inner tub rotate; a gear unit which transfers the rotational force between the first dehydration axis and the second dehydration axis and between the first wash axis and the second wash axis; and a clutch unit which controls rotation of the first dehydration axis at a wash stroke to thus make the rotational force generated from the BLDC motor transferred from the first wash axis to the second wash axis so as to make the pulsator rotate, and which makes the first dehydration axis rotatable at a dehydration stroke to thereby make the rotational force generated from the BLDC motor transferred to the second wash axis and the second wash axis through the gear unit, to thereby make the pulsator and the inner tub rotate simultaneously.

Preferably but not necessarily, the gear unit comprises: a drum that connects the first dehydration axis and the second dehydration axis mutually, and forms an external shape of the gear unit; a sun gear linked with the first wash axis; a number of planetary gears which are engaged with the sun gear to rotate; a gear axis which becomes the revolutionary center when the planetary gears are engaged with the sun gear; and a carrier which supports the upper/lower portions of the gear axis, and which is connected with the second wash axis, wherein rotation of the first dehydration axis is controlled at a wash stroke, to thus make the drum fixed and transfer the rotational force delivered by the planet gears which are engaged with the sun gear to then rotate is transferred to the second wash axis through the carrier, and wherein the first dehydration axis is supported to the BLDC motor to then rotate at a dehydration stroke, and to thereby make the drum rotate and the rotational force is transferred to the second dehydration axis and the second wash axis.

Preferably but not necessarily, the clutch unit comprises: a clutch housing that encloses and protects the drum, and is fixedly combined with a stator of the BLDC motor; a bushing that makes the first dehydration axis supported to the rotor support frame, and makes the first dehydration axis rotatable according to the rotational force that is generated from the BLDC motor; a clutch gear located at the outer side surface of part of the first dehydration axis and the bushing; a clutch lever that moves to a first direction at the wash stroke, and moves to a second direction at the dehydration stroke; and a clutch coupler that is combined with the clutch gear, when the clutch lever moves to the first direction, and that is seceded from the clutch gear, when the clutch lever moves to the second direction, wherein the clutch coupler is closely adhered to the first dehydration axis to thus control rotation of the first dehydration axis when the clutch coupler is combined with the clutch gear, and the first dehydration axis is rotatably set when the clutch coupler is seceded from the clutch gear.

Preferably but not necessarily, the driving device for the full automatic washing machine further comprises: a torsion spring which is located between the bushing and the clutch gear, wherein the torsion spring is closely adhered to the bushing and the first dehydration axis, when the clutch coupler is combined to the clutch gear, to thus add a reverse torsion force to a bearing force that controls rotation of the first dehydration axis to thereby fixedly tighten the bushing.

Preferably but not necessarily, the driving device for the full automatic washing machine further comprises: first and second sleeve bearings which support rotation of the first wash axis and the second wash axis at respectively different two points in place, and whose center is located on an identical line that runs in parallel with the central axis of the first and second wash axes; a first bearing that is located between the first wash axis and the first dehydration axis and supports rotation of the first dehydration axis; and a second bearing that is located between the second wash axis and the second dehydration axis and supports rotation of the second dehydration axis.

Preferably but not necessarily, the BLDC motor comprises: a double-rotor having inner and outer rotors in which the first dehydration axis that is supported through the first wash axis and the bushing that are combined through the central portion thereof, a number of N-pole and S-pole magnets are arranged on the outer circumference of an inner yoke and the inner circumference of an outer yoke, and opposing magnets are arranged to have a reverse polarity; and an integral type stator that is integrally formed in an annular form by insert-molding thermosetting resin at a state where a number of division type core assemblies and a sensor holder which is combined with a Hall sensor have been temporarily assembled on a printed circuit board (PCB) for an assembly, and that is fixed to the clutch housing, in which the number of division type core assemblies are installed to have a mutual gap between the inner and outer rotors, and coils are wound around bobbins which are respectively combined with division type cores in the number of the division type core assemblies.

Preferably but not necessarily, the integral type stator comprises: a number of division type core assemblies which enclose bobbins each having inner and outer flanges in which first and second coupling protrusions are formed at the lower-centers of the inner and outer sides of a number of division type cores, and coils are wound around each bobbin; an assembly PCB in which the respective division type core assemblies are automatically positioned and both ends of the coil are mutually connected by each phase U, V, or W; and a stator holder that is integrally formed by insert-molding the respective division type core assemblies that have been assembled on the assembly PCB using thermosetting resin, and wherein the assembly PCB comprises: a central area that is formed in an annular form, and comprises a number of conduction lines which are printed on the lower surface to connect the coil mutually by each phase; a number of coupling areas which are smaller than the area of the lower end of the division type core assemblies and are extended radially from the central area, and in which first and second coupling grooves accommodating the first and second coupling protrusions are provided at positions corresponding to the first and second coupling protrusions of the division type core assemblies, to thereby automatically position each of the division type core assemblies; and a circuit area which makes a driving signal input to the coil of the first division type core assembly by each phase, and makes the respective Hall sensors position at the lower portion of the inner yoke in which sensor coupling protrusions which are provided in the sensor holder are accommodated in a pair of sensor coupling grooves which can automatically position the respective Hall sensors.

Preferably but not necessarily, the stator holder comprises: an extension portion which is extended in the central direction of the stator, and fixes the integral type stator to the clutch housing; and a number of support strength reinforcement ribs for reinforcing strength of the stator, which are formed on the outer circumference thereof.

Preferably but not necessarily, the BLDC motor is formed of a 18-core-24-pole structure, and skew is applied to the division type core within one pitch range which is defined as [360°/the number of cores (slots)], and wherein the stator is configured so that eighteen division type core assemblies are combined on the PCB for the assembly in an annular form in sequence of U, W, and V, the respective start wiring lines of the first division type core assembly of each phase are connected with respective input ends through which driving signals are input, the end wiring lines of the division type core assembly by each phase are connected with the start wiring lines of the division type core assembly of a neighboring identical phase, and the end wiring lines of the sixth division type core assembly are connected with each other to thus form neutral point.

According to another aspect of the present invention, there is provided a power transmission device for a full automatic washing machine, which selectively transfers a rotational force generated from a motor to a pulsator and an inner tub, the power transmission device comprising: a wash axis unit that comprises a first wash axis which is fixedly combined with the central portion of a rotor of a motor and a second wash axis whose one side is linked with the pulsator to rotate in a forward/reverse direction, and through the other side of which a rotational force is received from the first wash axis; a dehydration axis unit that comprises a first dehydration axis which is coaxially combined on the outer circumference of the first wash axis, and which is supported to the rotor support frame so as to rotate, and a second dehydration axis whose one side is connected with the inner tub, and through the other side of which the rotational force is received from the first dehydration axis; a bushing which is located between the first dehydration axis and the rotor of the motor, to thus rotatably support the first dehydration axis to the rotor; a gear unit that comprises a drum that mutually connects the first dehydration axis and the second dehydration axis, a sun gear which is linked with the first wash axis, a number of planetary gears which are engaged with the sun gear to rotate, a gear axis which becomes the revolutionary center when the planetary gears are engaged with the sun gear, and a carrier which supports the upper/lower portions of the gear axis, and which is connected with the second wash axis; a clutch unit that comprises a clutch housing that encloses and protects the drum, a clutch gear located at the outer side surface of part of the first dehydration axis and the bushing, and a clutch coupler that is combined with the clutch gear at the wash stroke, so that the clutch gear makes the bushing and the first dehydration axis fixed, and that makes the clutch gear seceded from the bushing and the first dehydration axis at the dehydration stroke; first and second sleeve bearings which support rotation of the first and second wash axes at respectively different two points in place; and first and second bearings that support rotation of the first and second dehydration axes at respectively different two points in place, wherein if the clutch gear fixes the bushing and the first dehydration axis at the wash stroke, the rotational force that is delivered through the first wash axis linked with the sun gear is transferred to the second wash axis through the carrier, and the rotational force that is delivered from the first dehydration axis which is supported by the bushing to rotate at the dehydration stroke is transferred to the second dehydration axis through the drum.

According to still another aspect of the present invention, there is provided a full automatic washing machine comprising: an outer tub which is installed in a case that forms an external shape; an inner tub which is rotatably installed in the outer tub; a pulsator that is rotatably installed in the inner tub; a brushless direct-current (BLDC) motor that produces a rotational force that rotates the inner tub and the pulsator; a first wash axis which is fixedly combined with a rotor support frame that is extended from a double-rotor of the BLDC motor; a second wash axis whose one side is connected with the pulsator, and whose other side is coupled with the first wash axis; a first dehydration axis which is coaxially combined on the outer circumference of the first wash axis, which is combined with the central portion of the double-rotor through a bushing, and which is supported to the first wash axis through a sleeve bearing so as to rotate; a second dehydration axis whose one side is connected with the inner tub, and whose other side is connected with the first dehydration axis; a gear unit which mutually connects the first dehydration axis and the second dehydration axis and mutually connects the first wash axis and the second wash axis, and which amplifies the rotational force generated from the BLDC motor according to a gear ratio to then transfer the amplified rotational force; and a clutch unit which makes the first dehydration axis and the bushing fixed and controls rotation of the first dehydration axis at a wash stroke to thus make the rotational force generated from the BLDC motor transferred from the first wash axis to the second wash axis through the gear unit, so as to make the pulsator rotate, and which makes the first dehydration axis and the bushing rotatable at a dehydration stroke to thereby make the first dehydration axis supported to the bushing to rotate so that the rotational force is transferred to the second dehydration axis through the gear unit, to thereby make the inner tub rotate.

Preferably but not necessarily, the clutch unit comprises: a clutch bushing that makes the first dehydration axis supported to the rotor support frame; a clutch gear located at the outer side surface of part of the first dehydration axis and the clutch bushing; a clutch lever that reciprocally moves to a first direction at the wash or dehydration stroke; and a clutch coupler that moves to a second direction according to the moving direction of the clutch lever, and that controls rotation of the first dehydration axis or makes the clutch gear rotatable, when the clutch coupler is attached to and detached from the clutch gear; and a torsion spring which is located between the clutch bushing and the clutch gear, wherein a reverse torsion force is added to a bearing force that controls rotation of the first dehydration axis to thereby fixedly tighten the bushing.

Preferably but not necessarily, the gear unit comprises: a drum that connects the first dehydration axis and the second dehydration axis mutually, and forms an external shape of the gear unit; a sun gear linked with the first wash axis; a number of planetary gears which are engaged with the sun gear to rotate; a gear axis which becomes the revolutionary center when the planetary gears are engaged with the sun gear; and a carrier which supports the upper/lower portions of the gear axis, and which is connected with the second wash axis, wherein the bushing and the first dehydration axis are fixed by the clutch gear at a wash stroke, to thus make the sun gear transfer the rotational force of the first wash axis to the second wash axis by the carrier, and the drum transfers the rotational force which is generated when the first dehydration axis is supported to the bushing to rotate to the second dehydration axis, at a dehydration stroke, to simultaneously make the sun gear transfer the rotational force to the second dehydration axis.

Preferably but not necessarily, the full automatic washing machine further comprises: first and second bearings which are located at a first point in pace where the first wash axis and the first dehydration axis are coaxially combined and at a second point in place where the second wash axis and the second dehydration axis are coaxially combined, to thus support rotation of the wash axis and the dehydration axis, respectively, and whose centers are located on the same lines as those parallel with the central axes of the wash axis and the dehydration axis, respectively; a first sleeve bearing that is located between the first wash axis and the first dehydration axis, to support rotation of the first wash axis; and a second sleeve bearing that is located between the second wash axis and the second dehydration axis, to support rotation of the second wash axis.

Preferably but not necessarily, a brushless direct-current (BLDC) motor of a structure of a double-rotor/single-stator type, which is used as a rotational force generator for a driving device for the full automatic washing machine, comprises: a rotating axis that is rotatably installed in a housing of the driving device; a double-rotor having inner and outer rotors in which the central portion of the double-rotor is combined with the rotating axis through a bushing, a number of N-pole and S-pole magnets are alternately arranged on the outer circumference of an inner yoke and the inner circumference of an outer yoke, on respectively different concentric circles in an annular form, and the opposing inner and outer magnets which oppose each other with a predetermined distance between the inner and outer magnets are arranged to have a reverse polarity, respectively; and an integral type stator that is integrally formed in an annular form by insert-molding thermosetting resin at a state where a number of division type core assemblies have been temporarily assembled on a printed circuit board (PCB) for an assembly to enable an automatic position-setting, in which the number of division type core assemblies are installed to have a mutual gap between the inner and outer rotors, and coils are wound around bobbins which are respectively combined with division type cores, and that is fixed through the extension portion in the housing of the driving device, and a pair of Hall sensor are positioned at the lower portion of the inner yoke so as to detect polarity of the inner magnet to then be integrally formed with the stator.

Advantageous Effects

As described above, according to the present invention, a clutch unit can control rotation of a dehydration axis without having a particular brake unit, since the clutch unit is closely adhered to a first dehydration axis and a bushing when the rotation of the dehydration axis is controlled according to a wash or dehydration stroke in a full automatic washing machine.

In addition, according to the present invention, since a clutch coupler of the clutch unit moves at a wash or dehydration stroke in a driving device of a washing machine to thus be attached to and detached from a clutch gear which controls rotation of the first dehydration axis, and to thereby control a rotational force which is transferred to an inner tub, the washing machine is embodied to have a simple clutch coupling structure.

Moreover, according to this invention, a pair of wash axes and a pair of dehydration axes are connected through a gear unit. At a wash stroke, rotation of the first dehydration axis is controlled by a clutch gear so that only the wash axis transfers the rotational force through a sun gear. At a dehydration stroke, the first dehydration axis is supported to the bushing to rotate. Accordingly, at the dehydration stroke, both the dehydration axis and the wash axis are rotated, and thus a coupling structure of rotating the wash axis and the dehydration axis can be implemented into a simple structure.

Further, a double-rotor and a single-stator of a brushless direct-current (BLDC) motor which is applied to a driving device of a full automatic washing machine are insert-molded into a waterproof structure, and a rotor holder of the double-rotor and a stator holder of the stator are insert-molded, to thus maximize a contact area of a bulk molding compound (BMC) molding material to thereby maximize durability.

Further, according to this invention, a washing machine employs a BLDC motor of a double-rotor/single-stator structure which can generate high power, to thereby further reduce a gear ratio, as well as minimize size of a space where the motor occupies in the washing machine, to thereby miniaturize the washing machine and minimize electric power consumption.

DESCRIPTION OF DRAWINGS

The above and other objects and advantages of the present invention will become more apparent by describing the preferred embodiments thereof in detail with reference to the accompanying drawings in which.

BEST MODE

Figure 1:
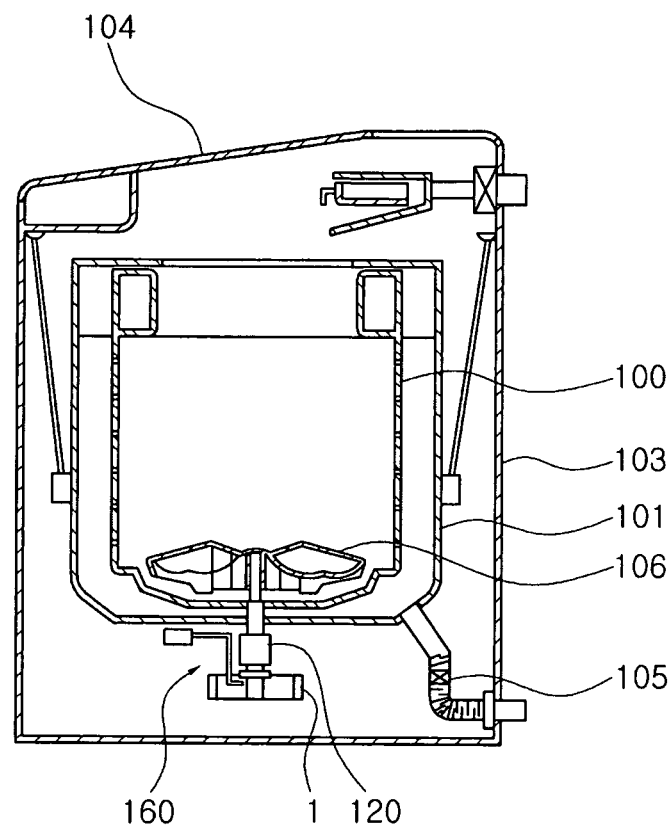
FIG. 1 is a schematic sectional view more concretely showing a configuration of a washing machine according to the present invention.

Hereinbelow, a pulsator washing machine according to a preferred embodiment of the present invention will be described with reference to the accompanying drawings. Like reference numerals denote like elements through the following embodiments.

FIG. 1 is a schematic sectional view more concretely showing a configuration of a washing machine according to the present invention. As shown in FIG. 1, the washing machine includes an outer tub 101 that contains wash water in the inside of an outer case 103 that forms an external shape of the washing machine, an inner tub 100 which is rotatably installed in the outer tub 101 in order to perform both wash and dehydration strokes, and a pulsator 106 which is rotatably installed on the bottom of the inner tub 100.

In addition, a cover 104 which is linked with an outer case 103 is installed in the upper portion of the washing machine, and a drain pipe 105 that discharges wash water at a rinse or dehydration stroke is installed in the lower portion of the outer tub 101.

The inner tub 100 and the pulsator 106 in the washing machine are connected with a clutch unit 160 and a BLDC motor 1 of a double-rotor/single-stator structure which are arranged in the lower portion of the outer tub 101, to thus receive a rotational force selectively to rotate and perform wash/rinse/dehydration strokes, respectively.

Figure 2:
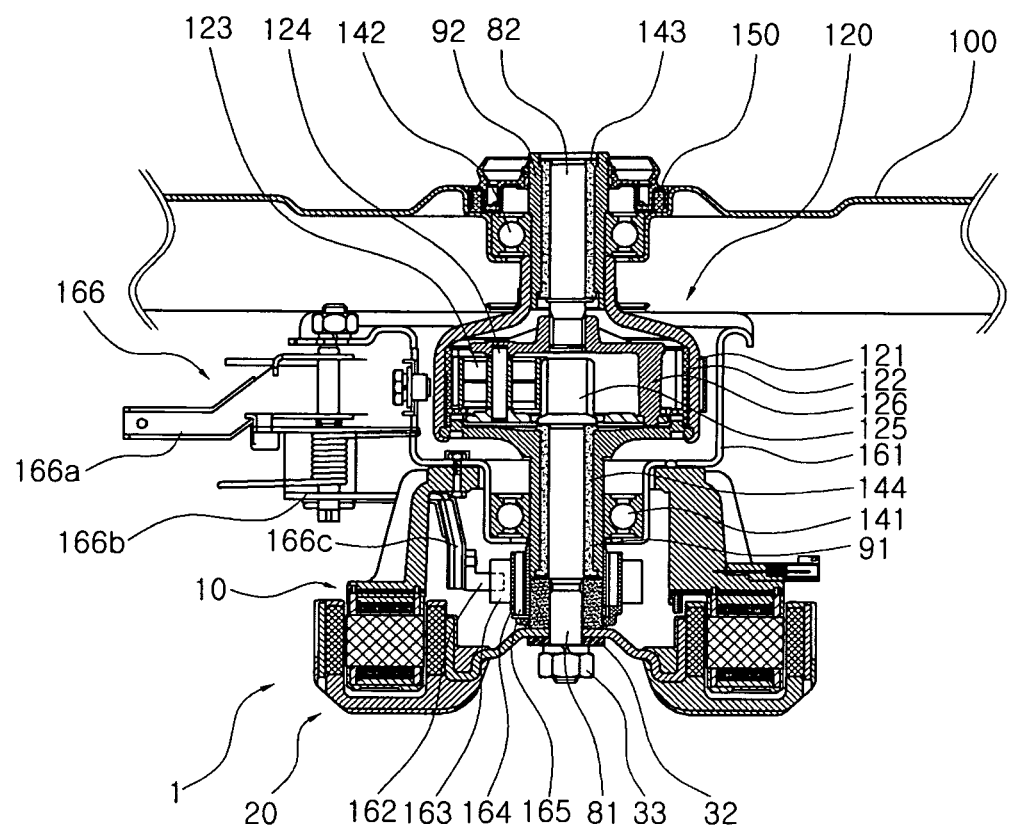
FIG. 2 is a cross-sectional view more concretely showing a driving device for a washing machine according to the present invention.

A driving device that transfers a rotational force to the inner tub 100 and the pulsator 106 in the washing machine is configured so that a second dehydration axis 92 of FIG. 2 of the BLDC motor 1 is directly connected with the inner tub 100, the second wash axis 82 of FIG. 2 is directly connected with the pulsator 106, and a gear unit 120 that amplifies the rotational force of the BLDC motor 1 is installed between the BLDC motor 1, and the inner tub 100 and pulsator 106.

FIG. 2 is a cross-sectional view more concretely showing a driving device for a washing machine according to the present invention.

Referring to FIG. 2, in the case of the driving device for the washing machine, a first wash axis 81 is located at the central part of the BLDC motor 1 of a double-rotor/single-stator structure that generates a rotational force, a first dehydration axis 91 is located on the outer circumference of the first wash axis 81, and a first sleeve bearing 144 is combined between the first wash axis 81 and the first dehydration axis 91. Accordingly, the first wash axis 81 is supported and rotated by the first sleeve bearing 144.

The first dehydration axis 91 is linked with a vessel type drum 121 on the inner circumference of which a toothed wheel 122 is formed and the drum 121 is linked with the second dehydration axis 92 which is connected directly with the inner tub 100.

Therefore, the first dehydration axis 91 transfers the rotational force generated from the BLDC motor 1 to the drum 121, and the drum 121 delivers the rotational force to the second dehydration axis 92, to thus rotate the inner tub 100.

In addition, the first and second wash axes 81 and 82 are placed in the first and second dehydration axes 91 and 92 at a state where the former coaxially penetrates the latter. The second wash axis 82 which penetrates the inner tub 100 is combined with the central portion of the pulsator 106 to thus make wash rotate in a forward/reverse direction.

To support rotation of the second dehydration axis 92, a second sleeve bearing 143 of an oilless type is installed between the second dehydration axis 92 and the second wash axis 82. In the inside of the drum 121 are provided a number of planetary gears 123, a single sun gear 125, and a gear unit 120 having a gear axis 124 and a carrier 126, which transfer and amplify the rotational force (power) of the BLDC motor 1.

A gear ratio of the gear unit 120 is set according to the number of the teeth of the sun gear 125 and the planetary gears 123, and it is preferable that the gear ratio of the gear unit 120 is set 5.3:1. Therefore, the gear unit 120 amplifies the rotational force that is generated from the BLDC motor 1 according to the ratio gear, to then transfer the amplified rotational force.

Meanwhile, the first wash axis 81 rotates in gear with the sun gear 125, and transfers the rotational force to the second wash axis 82 through the carrier 126. In addition, the planetary gears 123 are installed so as to rotate on its own axis around the gear axis 124, and to revolve in the inside of the carrier 126.

In addition, a clutch housing 161 is provided in order to enclose and protect part of the first dehydration axis 91, the drum 121 and the second dehydration axis 92, in which a clutch lever 166 is combined with the clutch housing 161. The first and second bearings 141 and 142 which rotatably support the first and second dehydration axes 91 and 92, respectively are installed on both end portions of the clutch housing 161.

In this case, it is preferable that the centers of the first and second bearings 141 and 142 are positioned on the same line running in parallel with those of the wash axes 81 and 82 and the dehydration axes 91 and 92. This is to avoid eccentricity from occurring when the wash axes 81 and 82 and the dehydration axes 91 and 92 rotate, to thereby reduce vibration and noise and maximize lifetime of the washing machine.

Moreover, a waterproof processing portion 150 to prevent water from permeating in the inner tub 100 to thereby cause breakdown and malfunction of the driving device of the washing machine is combined between the second dehydration axis 92 and the inner tub 100, and the waterproof processing portion 150 encloses the second bearing 142 and is combined with the second bearing 142.

In addition, the first wash axis 81 is connected with the double-rotor 20 by clamping a washer 32 and a fixing nut 33 from the outside in the central part of the rotor support frame 23 of the double-rotor 20 in the BLDC motor 1, and the first dehydration axis 91 is fixedly supported to a support frame 23 of the double-rotor 20 through a bushing 31.

The first sleeve bearing 144 is inserted between the first wash axis 81 and the first dehydration axis 91, so that the first wash axis 81 can be rotatably supported.

Moreover, as illustrated in FIG. 2, a clutch gear 163 which selectively controls transferring of the rotational force of the first wash axis 81 and the first dehydration axis 91 according to motion of a clutch lever 166, is installed on the outer side of part of the first dehydration axis 91 and the bushing 31, and a clutch coupler 162 which is attached to and detached from the clutch gear 163 according to motion to the clutch lever 166 is installed at one side of the clutch gear 163. Accordingly, the clutch coupler 162 is attached to and detached from the clutch gear 163, according to a wash or dehydration stroke of the washing machine.

The clutch lever 166 is configured to have a lever 166a which moves back and forth for example at a wash or dehydration stroke, and a transfer portion 166b which makes a clutch link 166c left and right according to the back and forth movement of the lever 166a, to thereby make the clutch coupler 162 attached to and detached from the clutch gear 163. The transfer portion 166b is configured to have a spring which provides elasticity which can make the lever 166a and the clutch link 166c into an original state after the lever 166a and the clutch link 166c have moved back and forth and left and right, and a housing which makes the spring fixed thereto, and makes the lever 166a and the clutch link 166c fixedly combined therewith, to accordingly make the clutch link 166c move left and right according to the back and forth movement of the lever 166a.

Figure 4A:
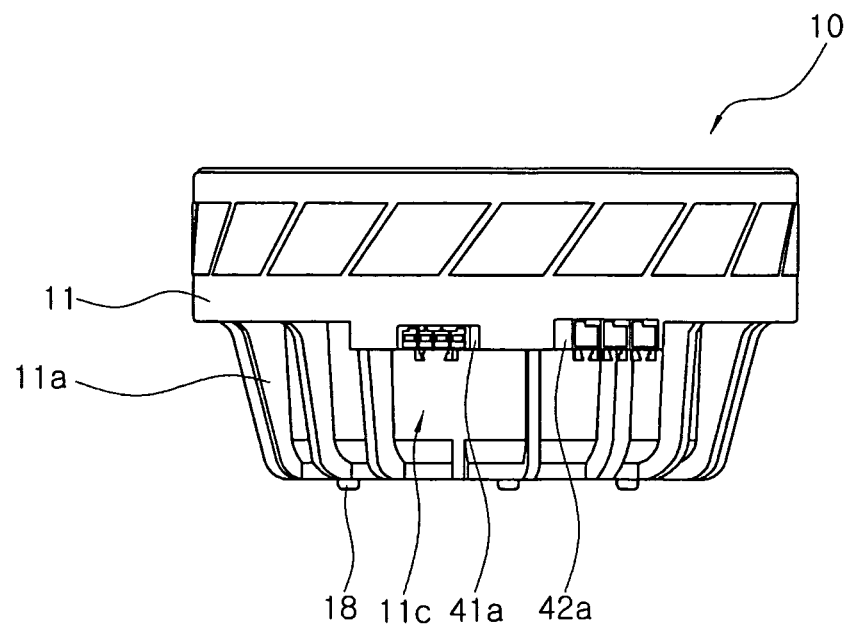
FIG. 4A is a front view of a stator according to a preferred embodiment of the present invention.

The clutch link 166c can be combined through a coupling hole 11c of FIG. 4A that is provided at one side of the stator holder 11.

Therefore, if the lever 166a moves forward for example at a dehydration stroke, the transfer portion 166b makes clutch link 166c to the left (that is, in the direction getting far away from the clutch gear 163) by the forward movement of the lever 166a, so that the clutch coupler 162 goes far from the clutch gear 163, to thereby make the first dehydration axis 91 rotate.

Meanwhile, if the lever 166a moves backward for example at a wash stroke, the transfer portion 166b makes the clutch link 166c to the right (that is, in the direction approaching to the clutch gear 163) by the backward movement of the lever 166a, so that the clutch coupler 162 is closely attached to the clutch gear 163, to thereby control rotation of the first dehydration axis 91 and make only the first wash axis 81 rotate.

The clutch gear 163 includes a torsion spring 164 that provides elasticity, and a clutch bushing 165 that fixes and supports the clutch gear 163, the first dehydration axis 91 and the bushing 31.

The clutch gear 163 controls rotation of the first wash axis 81 and the first dehydration axis 91 according to the wash stroke or dehydration stroke of the washing machine. At the wash stroke, the clutch coupler 162 is closely adhered to the clutch gear 163, to then be closely adhered to the first dehydration axis 91 and the bushing 31.

Therefore, the first dehydration axis 91 is closely fixed to the clutch gear 163 and does not rotate but is fixed by the frictional force with the clutch gear 163 and the elastic force of the torsion spring 164. Here, the torsion spring 164 adds an elastic force, for example, a reverse torsion force, to a bearing force with which the clutch gear 163 makes the first dehydration axis 91 not rotate. As a result, the first dehydration axis 91 and the bushing 31 are fixed with a stronger force.

Therefore, the clutch gear 163 makes the first dehydration axis 91 not rotate but fixed at the wash stroke of the washing machine. Accordingly, the rotational force which is generated in the forward/reverse direction from the BLDC motor 1 is amplified and transferred according to a predeterminate gear ratio in the order of the sun gear 125, the carrier 126 and the second wash axis 82 through the first wash axis 81. Accordingly, the pulsator 106 which is connected with the second wash axis 82 is made to rotate. Here, the planetary gears 123 is engaged with the sun gear 125 between the carriers 126 that support the upper/lower portions of the gear axis 124 to then rotate on its own axis.

That is, at the wash stroke, the first dehydration axis 91 makes the bushing 31 and the first dehydration axis 91 which are supported to the double-rotor 20. Accordingly, the rotational force of the BLDC motor 1 is transferred to only the second wash axis 82 through the first wash axis 81 and the gear unit 120, and the first wash axis 81 and the second wash axis 82 are supported to the first and second sleeve bearings 143 and 144 to then rotate.

Meanwhile, the clutch coupler 162 is seceded from the clutch gear 163 at the dehydration stroke of the washing machine, and the clutch gear 163 releases the bearing force that fixes the first dehydration axis 91 and the bushing 31.

Therefore, the bearing force that controls the bushing 31 that supports the first dehydration axis 91 and rotation of the first dehydration axis 91 is released from the double-rotor 20. Accordingly, the first dehydration axis 91 is supported to the bushing 31 to rotate, and the rotational force is transferred to the second dehydration axis 92 through the drum 121 that is engaged with the first dehydration axis 91.

The first dehydration axis 91 and the second dehydration axis 92 are connected through the drum 121 in the washing machine, and the first wash axis 81 and the second wash axis 82 are connected through the sun gear 125 and the carrier 126. The first dehydration axis 91 and the second dehydration axis 92 and the first wash axis 81 and the second wash axis 82 are configured and combined in a simple structure so that the first wash axis 81 transfers the rotational force to the second wash axis 82 through the gear unit 120, and the first dehydration axis 91 transfers the rotational force to the second dehydration axis 92 through the drum 121.

In addition, at the wash stroke of the washing machine, rotation of the first dehydration axis 91 is controlled through the clutch gear 163. Accordingly, the second dehydration axis 92 does not rotate but only the pulsator 106 is made to rotate in the forward/reverse direction. At the dehydration stroke, control of the dehydration axis 91 is released to thus make the avoiding that the inner tub 100 and the pulsator 106 rotate. The first wash axes 81 and 82 and the first and second dehydration axes 91 and 92 can be combined to thus rotate without a separate coupling structure of coupling the first wash axes 81 and 82 and the first and second dehydration axes 91 and 92.

Hereinbelow, a BLDC motor of a double-rotor/single-stator structure which is applied to a driving device of a washing machine according to this invention will be described in more detail.

Figure 3A:
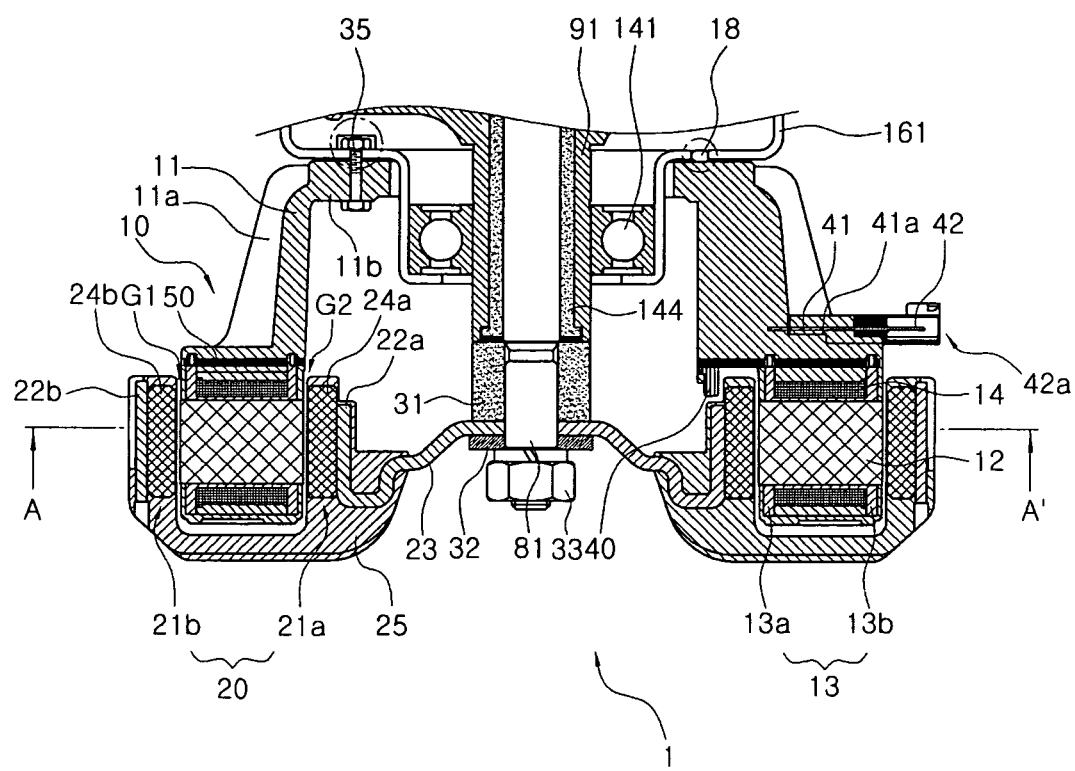
FIG. 3A is a cross-sectional view of a brushless direct-current (BLDC) motor of a double-rotor/single-stator structure according to the present invention, which is cut along the axial direction.
Figure 3B:
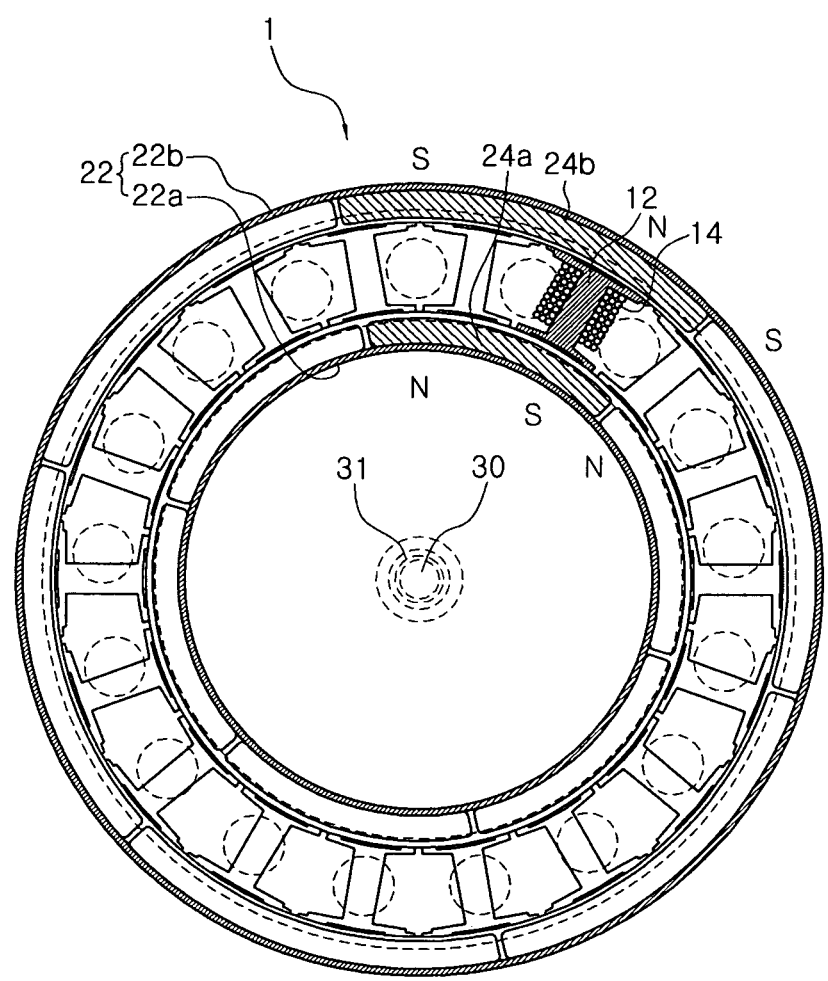
FIG. 3B is a cross-sectional view which is cut along a line A-A' of FIG. 3A.

FIG. 3A is a cross-sectional view of a brushless direct-current (BLDC) motor of a double-rotor/single-stator structure according to the present invention, which is cut along the axial direction, and FIG. 3B is a cross-sectional view which is cut along a line A-A' of FIG. 3A.

Referring to FIGS. 3A and 3B, the BLDC motor 1 of the double-rotor/single-stator structure includes: a stator 10 which is integrally formed by an annular stator holder 11 which is manufactured by insert-molding a number of division type cores 12 using thermosetting resin after coils 14 have been wound on the outer circumferences of bobbins 16, respectively; a double-rotor 20 including an inner rotor 21a in which a number of inner magnets 24a and a number of ring shaped inner yokes 22a are arranged on the inner and outer circumferences of the stator 10 in an annular form with predetermined gaps G1 and G2, and an outer rotor 21b in which a number of outer magnets 24b and a number of ring shaped outer yokes 22b are arranged thereon; and a first wash axis 81 and a first dehydration axis 91 that are supported rotatably by a sleeve bearing 144 and a first bearing 141.

Therefore, the BLDC motor 1 becomes a radial core type BLDC motor of the double-rotor/single-stator structure that the inner rotor 21a and the outer rotor 21b are supported to the rotor support frame 23.

A Hall sensor 40 is integrally disposed at a position corresponding to the lower end portion of the inner magnet 24a at one side surface of the stator holder 11 so as to detect polarity of the inner magnet 24a. In addition, a sensor terminal 41 which transfers a position signal detected by the Hall sensor 40 to a controller (not shown) which controls the driving device of the washing machine, a sensor housing 41a in which the signal terminal 41 is installed, a signal terminal 42 which applies a driving signal to the coil 14, and a signal housing 42a in which the signal terminal 42 is installed, are positioned at one side surface of the stator holder 11.

As described above, the Hall sensor 40 is positioned at the lower portion of the inner yoke 22a in opposition to the inner magnet 24a. Accordingly, polarity of the inner magnet 24a can be accurately detected. Further, by detecting the polarity of the inner magnet 24a, a signal to noise (S/N) ratio of a detection signal that is transferred to the controller (not shown) can be maximized.

Therefore, it is desirable that the inner yoke 22a is formed shorter in length by height of the Hall sensor 40 than the outer yoke 22b. Otherwise, it is desirable that the upper surface of the stator holder 11 on which the Hall sensor 40 is located is formed lower by height of the Hall sensor 40.

The first wash axis 81 can be combined with the central portion of the rotor support frame 23 by tightening with a fixing nut 33 using a bushing 31 and a washer 32, and is supported to the sleeve bearing 144 to then rotate as the double-rotor 20 rotates.

In addition, the first dehydration axis 91 is supported to the rotor support frame 23 through the bushing 31, and is supported to the first bearing 141 as the first wash axis 81 rotates.

Meanwhile, as illustrated in FIGS. 4A to 4D, a number of perfectly divided division type cores 12 are temporarily assembled through the annular assembly PCB 50, and insert-molded to thus be integrally molded by the annular form stator holder 11. The stator holder 11 includes an extension portion 11b which is extended vertically toward the clutch housing 161, and then is extended horizontally inwards so as to oppose the bottom of the clutch housing 161, in which the extension portion 11b can be combined with the clutch housing 161.

A fixing bolt 35 is fitted into a number of coupling portions (a reference numeral 15 of FIG. 4C) which are formed in the extension portion 11b and a through-hole which formed in the clutch housing 161, to then be bolt-coupled. The BLDC motor 1 is fixed to the clutch housing 161 and a number of protrusions 18 are coupled with a coupling position guide grooves which are formed at the lower portion of the clutch housing 161, so that the BLDC motor 1 is fixed to the clutch housing 161 at a predetermined position.

In addition, a number of ribs 11a for strengthening a support strength of the BLDC motor 1 are formed on the outer surface of the stator holder 11.

The first and second bearings 141 and 142 support the first and second dehydration axes 91 and 92 and the first and second wash axes 81 and 82 at two points in pace, respectively, so as to be rotatable. Here, the centers of the first and second bearings 141 and 142 are positioned on an identical line with respect to the centers of the first and second dehydration axes 91 and 92 and the first and second wash axes 81 and 82 which are coaxially combined. As a result, when the first and second wash axes 81 and 82 and the first and second dehydration axes 91 and 92 are made to rotate at wash/rinse/dehydration strokes, eccentricity is prevented from occurring, to thus reduce vibration and noise and to thereby extend lifetime of the washing machine.

In addition, FIG. 3B illustrates a state that coils 14 are not wound around the division type cores 12 for convenience of explanation. Here, the BLDC motor 1 according to the present invention does not employ an existing 27-core-24-pole structure but employs a 18-core-12-pole structure.

This is to lessen torque ripple of the BLDC motor 1. If a 18-core-12-pole structure is applied, torque ripple becomes small and simultaneously cogging torque becomes large. Therefore, a skew mode is applied to the division type cores 12. Thus, the BLDC motor 1 according to this invention can minimize vibration and noise when driven. The detailed description of a skew structure will be described later.

Meanwhile, the inner and outer magnets 24a and 24b that constitute the double-rotor 20 of the BLDC motor 1 according to this invention can be formed by positioning fox example, six magnetic substances so as to oppose mutually, and magnetizing both portions of each magnetic substance to an N-pole or an S-pole. Here, polarities of the inner magnet 24a and the outer magnets 24b which oppose each other have a reverse polarity each other.

Figure 4B:
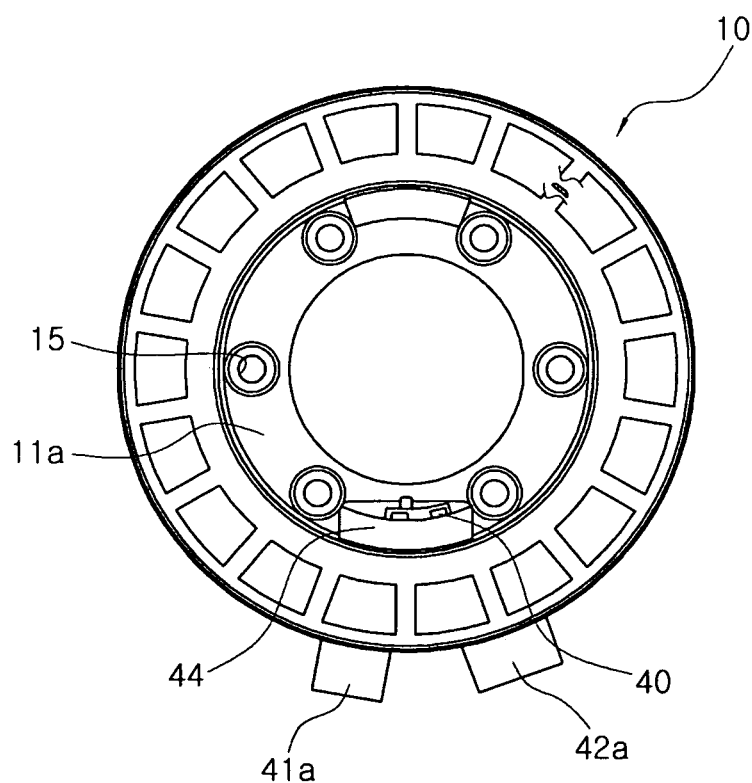
FIG. 4B is a plan view of the stator of FIG. 4A.
Figure 4C:
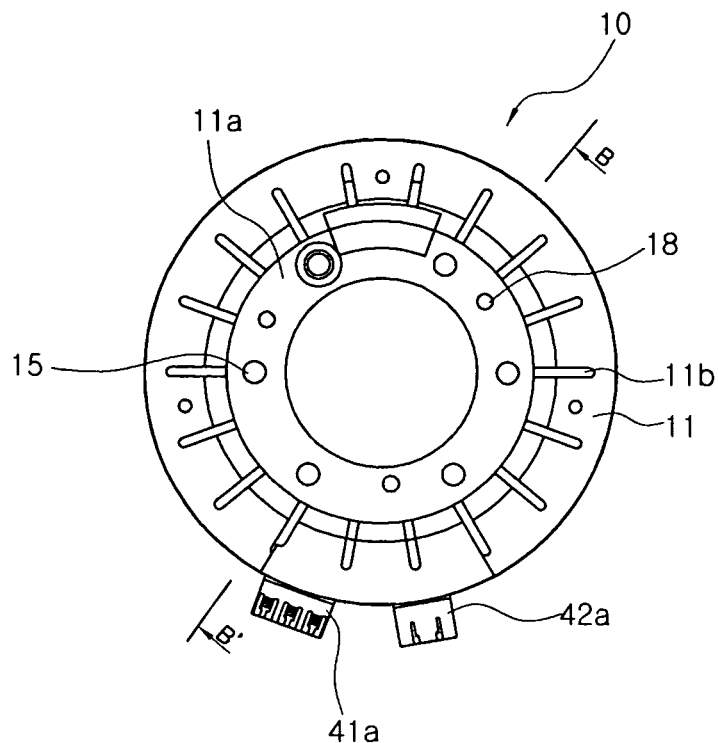
FIG. 4C is a bottom view of the stator of FIG. 4A.
Figure 4D:
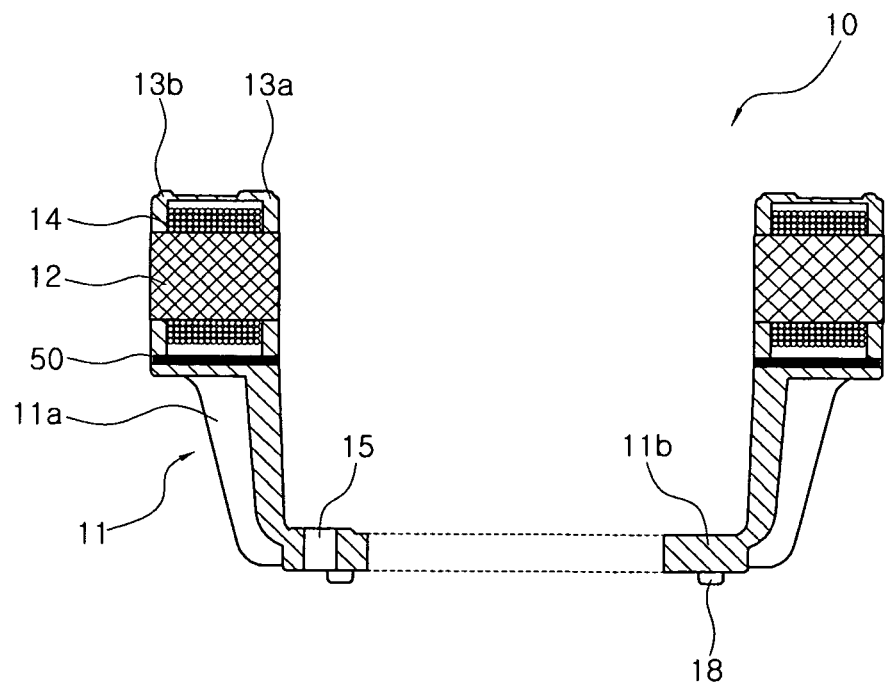
FIG. 4D is a cross-sectional view of the stator which is cut along a line B-B' of FIG. 4C.

FIG. 4A is a front view of a stator according to a preferred embodiment of the present invention. FIG. 4B is a plan view of the stator of FIG. 4A. FIG. 4C is a bottom view of the stator of FIG. 4A. FIG. 4D is a cross-sectional view of the stator which is cut along a line B-B' of FIG. 4C.

Referring to FIGS. 4A to 4D, the sensor housing 41a accommodating the sensor terminal 41, and the signal housing 42a accommodating the signal terminal 42 are positioned at one side of the stator 10 according to this invention. In addition, the sensor holder 44 accommodating the Hall sensor 40 are positioned at the inner side opposing the sensor housing 41a and the signal housing 42.

The extension portion 11a is extended toward the inner side of the inner yoke 22a, that is, the central portion is formed on the inner circumference of the stator 10. A number of coupling holes 15 are provided in the extension portion 11a, so as to be combined with the clutch housing 161 in various coupling structures such as a bolt/nut coupling structure.

In addition, it is desirable that the Hall sensor 40 is integrally formed on the inner circumference where the sensor housing 41 is located, and the stator holder 11 is formed in minimum thickness in order to minimize weight of the BLDC motor 1. Accordingly, a number of support strength reinforcement ribs 11a are formed on the inner circumference where the sensor housing 41 is located, in order to minimize thickness of the stator holder 11 as well as reinforce strength of the BLDC motor 1. A number of protrusions 18 which are combined with the coupling position guide grooves of the clutch housing 161 are formed in the lower portion of the extension portion 11a.

Here, it is desirable that the sensor holder 44 having a built-in Hall sensor 40 is located and integrally formed in the stator holder 11. Accordingly, the thickness of an area where the Hall sensor 40 is positioned is formed thicker by width of the sensor holder 44.

A coupling hole 11c that is provided at one side of the stator holder 11 is a space through which the clutch link 166c of the clutch lever 166 passes.

As illustrated in FIG. 4B, the sensor holder 44 which makes the Hall sensor 40 fixed and positioned is positioned on the inner circumference of the stator 10 opposing positions of the sensor housing 41a and the signal terminal 42a. The sensor holder 44 makes for example, a pair of Hall sensors 40 fixed, and is integrally formed with the stator holder 11. That is, the sensor holder 44 establishes the Hall sensor 40 so as to be located at the lower portion of the inner yoke 22a.

Hereinbelow, a manufacturing process of the integral type stator 10 including eighteen division type cores 30 will be described in more detail.

Figure 5A:
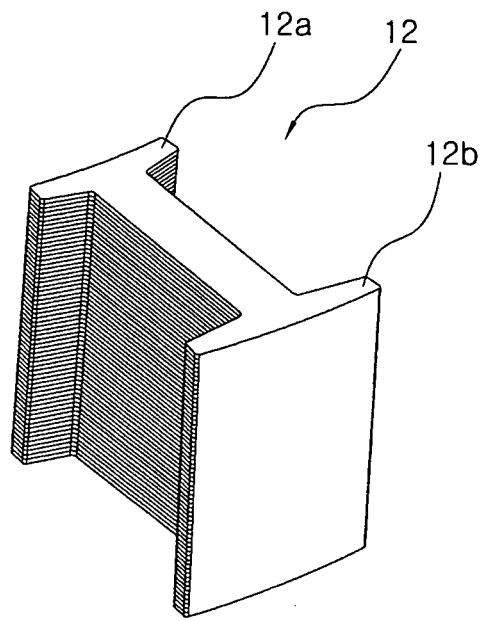
FIG. 5A is a perspective view of a division type core according to the present invention.
Figure 5B:
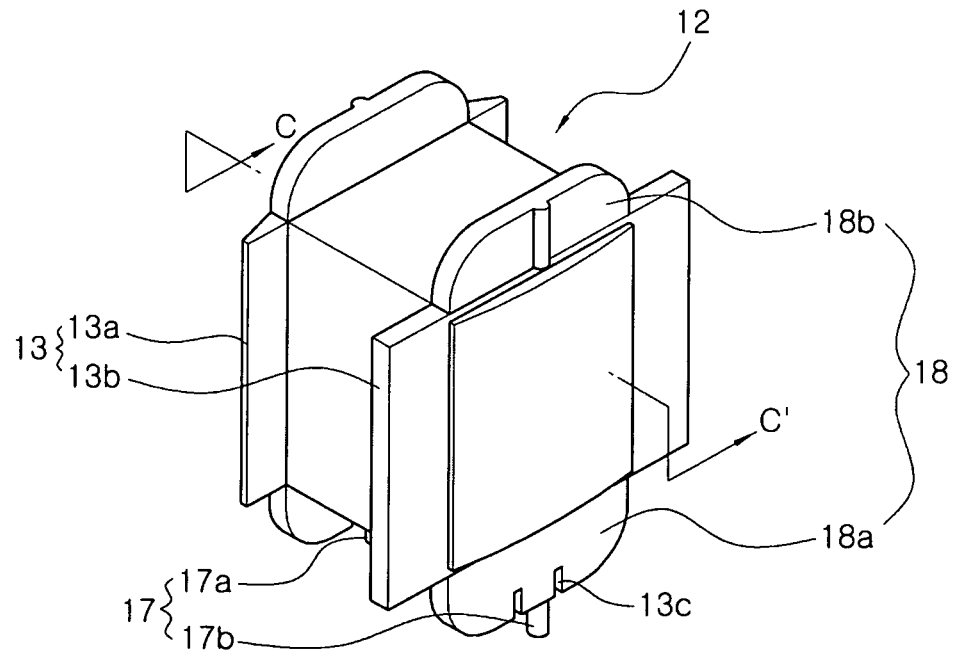
FIG. 5B is a perspective view showing a state where a bobbin is combined with the division type core of FIG. 5A.
Figure 5C:
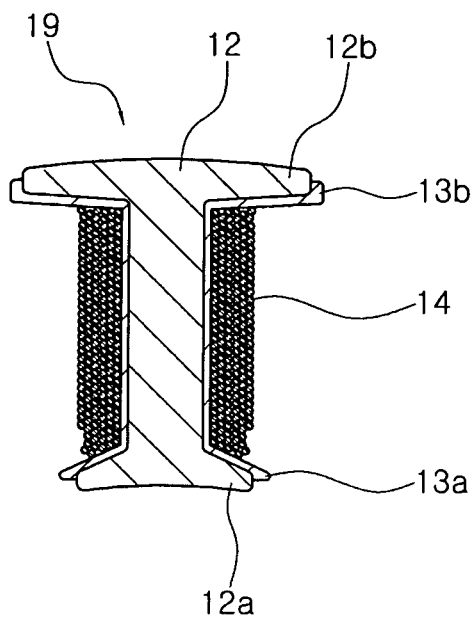
FIG. 5C is a cross-sectional view of the state where coils are wound around the division type core of FIG. 5B and which is cut along a line C-C' of FIG. 5B.

FIG. 5A is a perspective view of a division type core according to the present invention. FIG. 5B is a perspective view showing a state where a bobbin is combined with the division type core of FIG. 5A. FIG. 5C is a cross-sectional view of the state where coils are wound around the division type core of FIG. 5B and which is cut along a line C-C' of FIG. 5B.

Referring to FIGS. 5A to 5C, the division type core 12 is configured to have a substantially T-shaped section for example, (or a substantially I-shaped section), and a bobbin 13 formed of an insulation material is combined with the outer circumference of the perfect division type core 12. The bobbin 13 includes a winding portion of a box-type shape around which a coil 14 is wound and which is formed in the middle of the bobbin 13, and inner and outer flanges 13a and 13b which are bent and extended at the inner and outer sides of the winding portion, respectively. The coil 14 is wound around the winding portion between the inner and outer flanges 13a and 13b.

In addition, flange extension portions 18a and 18b are extended at both side surfaces of the inner and outer flanges 13a and 13b, to thus guide the coil 14 to be wound and further make it easy to assemble the division type core assemblies 19.

In addition, through-holes 13c that can withdraw the coil 14 are provided in the flange extension portion 18a where coupling protrusions 17a and 17b are formed, to thus input a driving signal through the withdrawn coil 14. It is desirable that two through-holes 13c are provided to withdraw start and end wiring lines of the coil 14.

The inner and outer flanges 13a and 13b which are bent and extended from the inner and outer sides of a linearly shaped body of the division type core 12, respectively, maintain a predetermined gap with respect to the annular inner and outer rotors 21a and 21b. For this purpose, the inner flange 13a is rounded inwards, and the outer flange 13b is rounded outwards.

Here, the stator 10 is generally formed in an annular form. Accordingly, it is desirable that the outer flange 13b is formed relatively larger than the inner flange 13a.

In addition, it is desirable to assemble the division type core 12 and the bobbin 13 so as to be integrally formed by an insert-molding method using thermosetting resin. However, the present invention is not limited thereto, but may be assembled by the other well-known methods.

After the bobbin 13 has been assembled with the division type core 12, the coil is wound around the independently perfectly divided division type cores 12, respectively, using a universal coil winding machine (not shown).

For example, the universal coil winding machine is a machine that winds a coil around a division type core by a turntable method. The universal coil winding machine is constructed to operate in a manless automation fashion. Accordingly, a coil winding work for each division type core 12 is achieved consecutively. That is, a number of division type cores are not wound at the same time using a special consecutive winding machine, in the case of the method of winding the coil 14 around the division type core 12 included in the stator 10 of the BLDC motor 1 according to this invention. Instead, the present invention winds the coil 14 around each division type core 12 using the universal coil winding machine which operates in a manless automation fashion, to thus enhance productivity of the BLDC motor 1.

First and second coupling protrusions 17a and 17b that make the division type core assemblies 19 automatically position on the assembly PCB 50, respectively are formed at one side of the inner and outer flanges 13a and 13b (for example, the lower-centers thereof).

As illustrated in FIG. 3C, thermosetting resin is molded on the outer surface of the eighteen division type cores 12, using an insert-molding method, respectively. Then, the coil 14 is wound around the outer circumference of the bobbin 13 at a state where an insulation bobbin 13 has been formed, to thus make a division type core assembly 19.

In addition, after the eighteen division type core assemblies 19 around which the coil 14 has been wound have been assembled on the assembly PCB 50 as shown in FIG. 3D, they are molded using thermosetting resin, to accordingly obtain a stator 10 that becomes an integral type by a stator holder 11.

Figure 5D:
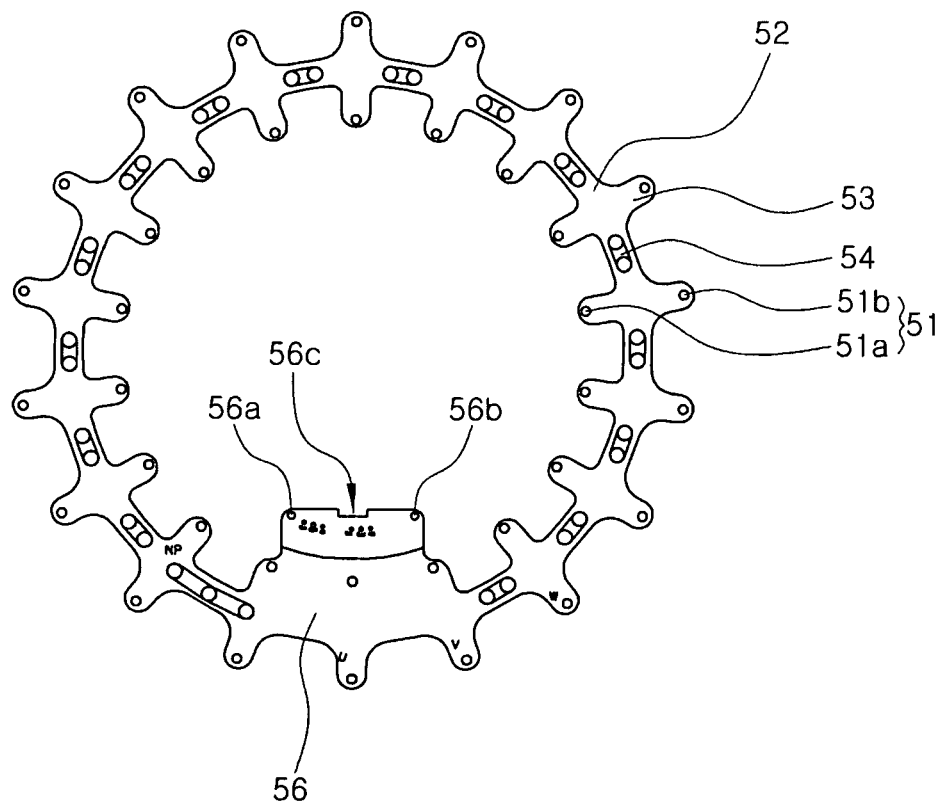
FIG. 5D is a bottom view of an assembly printed circuit board (PCB)

FIG. 5D is a bottom view of an assembly printed circuit board (PCB) according to the present invention.

Referring to FIG. 5D, the assembly PCB 50 includes: a central area 52 where the division type core assemblies 19 are supported and combined according to an annular form of the stator 10; coupling areas 53 where the division type core assemblies 19 are automatically positioned and combined; and a circuit area 56 which is combined with a sensor holder 44 and transfers a detection signal that is transferred from the Hall sensor 40 that is combined through the sensor holder 44 to a controller, and mutually connects a signal terminal 42, a sensor terminal 41, etc. on circuit.

A number of conduction lines 54 are arranged on the central area 52 of the assembly PCB 50, in which the number of conduction lines 54 mutually connect both ends of the coil 14 of the division type core assemblies 19 of an identical phase (U, V, W). It is desirable that the conduction lines 54 are arranged on the central area 52 where no coupling areas 53 are formed.

In addition, no PCBs are formed at the inner and outer sides of the central area 52 other than the coupling areas 53. Accordingly, when the stator 10 is injection-molded by an insert-molding method using thermosetting resin, an adhesive strength of thermosetting resin is maximized, to thus firmly manufacture the stator 10 of the BLDC motor 1, and to thereby reinforce durability after having injection-molded the stator 10.

That is, it is desirable that the central area 52 of the assembly PCB 50 is formed of a band shape style in an annular form, and the coupling areas 53 are vertically extended from the central area 52 so as to be smaller than an area of the lower end portion of the division type core assembly 19, to thus maximize a contact area of thermosetting resin. Accordingly, the contact area of thermosetting resin is increased, to thus increase durability of the stator 10.

Here, a distance spaced between the coupling area 53 and the assembly PCB 50 can be decided according to size of the division type core assembly 19, and a distance separated between the coupling areas 52 is consistently kept.

Meanwhile, the coupling method of coupling the division type core assemblies 19 and the assembly PCB 50 will be briefly described below. First of all, the bobbin 13 of the insulation material is integrally combined with the division type core 12, and the division type core assembly 19 where the coil 14 is wound in the space that is provided by the bobbin 13 is combined with the coupling areas 53 of the assembly PCB 40

Here, the first and second coupling protrusions 17a and 17b which are formed on the lower portions of the inner and outer flanges 13a and 13b of the bobbin 13 are fitted into the first and second coupling grooves 51a and 51b which are formed at the coupling areas 53 of the assembly PCB 50, and automatically positioned and assembled.

Therefore, in the case that a number of division type core assemblies 19 are assembled using the assembly PCB 50, an assembly position is automatically decided by the first and second coupling protrusions 17a and 17b of the bobbin 130 and the first and second coupling grooves 51a and 51b of the PCB 50 for assembly. Accordingly, even unskilled workers may perform an assembly work easily, to thus make assembly productivity very excellent.

Moreover, the stator 10 is temporarily assembled so that the division type core assemblies 19 are combined on the assembly PCB 50. Here, since the inner and outer extension portions 12a and 12b of the division type core 12 have inward and outward curved surfaces at predetermined curvatures, respectively, a deviation from roundness of the inner and outer circumferences of the number of the division type core assemblies 19 becomes high. Accordingly, the inner and outer extension portions 12a and 12b of the division type core 12 are proximate between the inner rotor 21a and the outer rotor 21b which are respectively located at the inner and outer portions of the stator 10, as well as keeps a predetermined magnetic gap therebetween.

Thereafter, both ends of the coil 14 of the division type core assembly 19 that has an identical phase (U, W, V) are mutually connected.

Figure 6A:
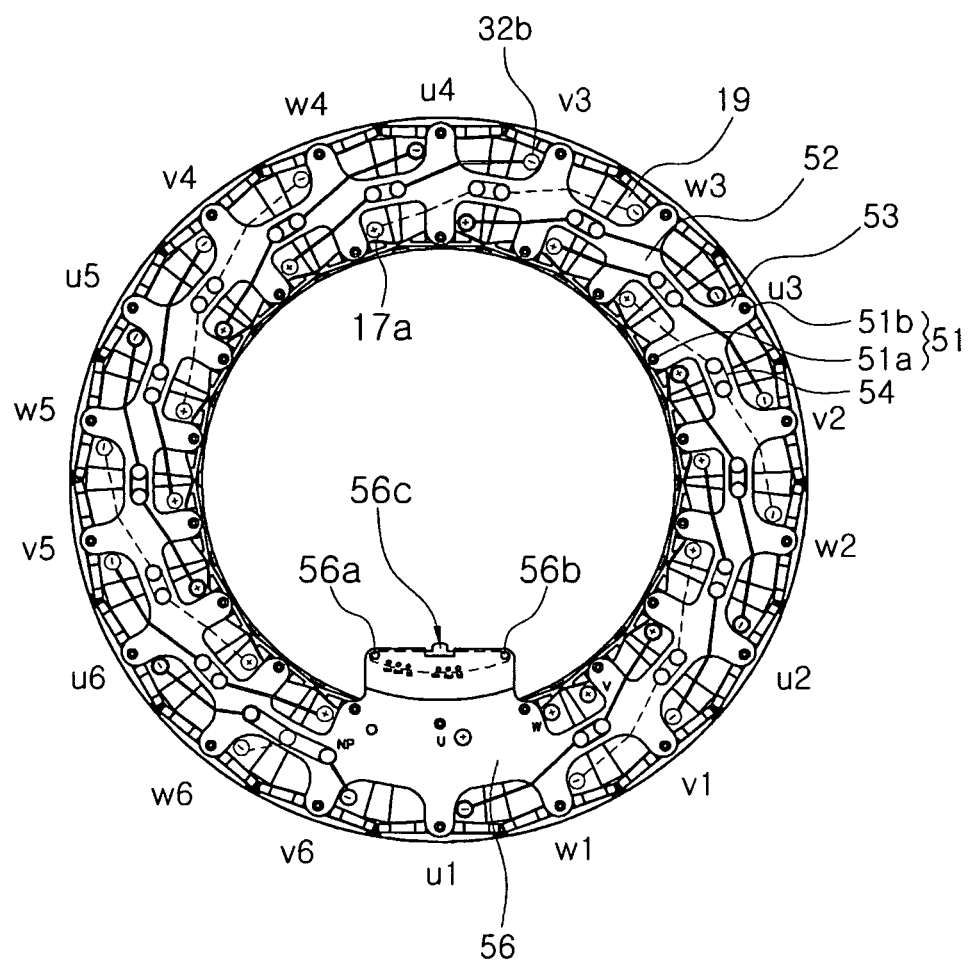
FIG. 6A is a bottom view showing a state where division type core assemblies which have been assembled on the assembly PCB are mutually connected in a three-phase (U, V, W) driving mode.
Figure 6B:
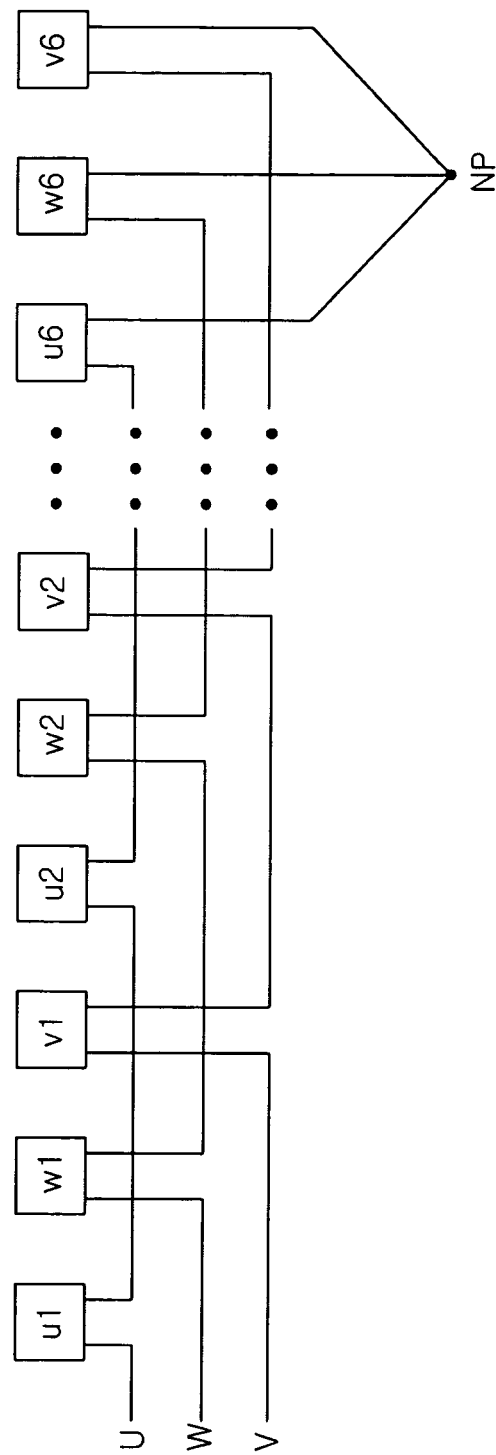
FIG. 6B is a connection diagram for explaining arrangement and connection states of the division type cores in the BLDC motor.
Figure 6C:
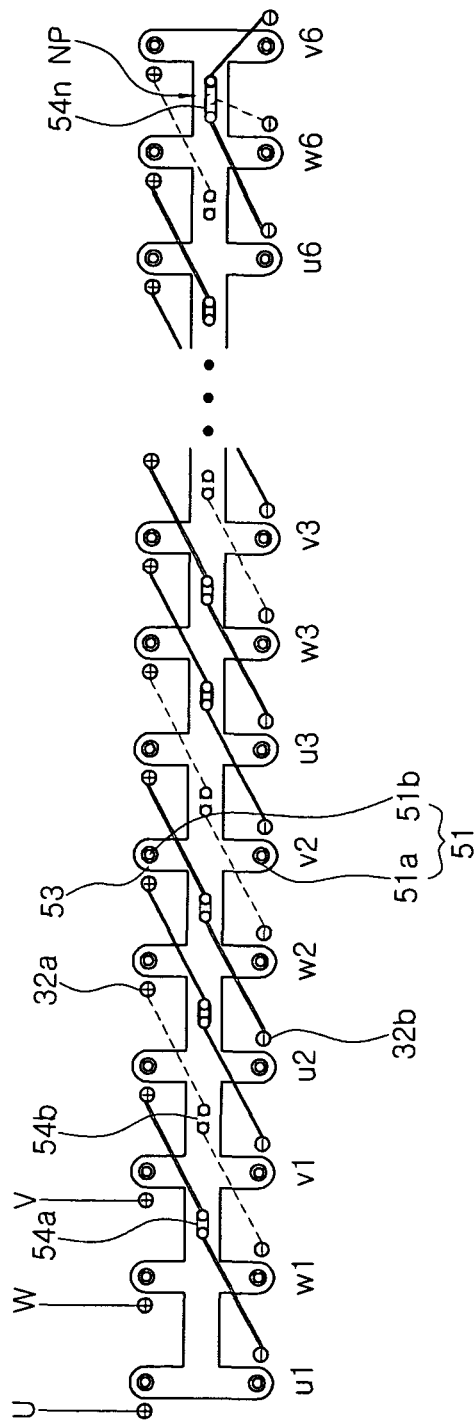
FIG. 6C is a diagram for explaining arrangement and connection structures for the assembly PCB of the division type core assemblies.

FIG. 6A is a bottom view showing a state where division type core assemblies have been assembled on the assembly PCB and both ends of the coil of an identical phase are mutually connected. FIG. 6B is a connection diagram for explaining arrangement and connection states of the division type cores in the BLDC motor. FIG. 6C is a diagram for explaining a state where both ends of the coil of an identical phase are mutually connected in a three-phase (U, V, W) driving mode.

Referring to FIGS. 6A to 6C, according to this invention, a number of division type core assemblies u1-v6, w1-w6, and v1-v6 (for example eighteen) are assembled by a three-phase 'Y' connection method using an assembly PCB 50, and a number of conduction lines 54a-54n are arranged at the central area 52 formed on the bottom of the assembly PCB 50, in order to connect both end portions of the coil 14 by each phase U, V, or W.

Here, it is preferable that the number of the conduction lines 54a-54n are arranged at a position where no coupling areas 53 are formed at the central area 52, and are formed into the minimum length in order to easily connect both end portions of the coil 14 by each phase and avoid wiring lines which connect both end portions of the coil 14 from overlapping each other.

Hereinbelow, in the detailed description of the present invention, a pair of through-holes (in the diagonal direction) are provided in the bobbin 13 that is combined with the division type core 12, and start/end wiring lines which are withdrawn from the coil 14 are connected between both ends of the coil 14 via connection pins 32a and 32b combined with the respective through-holes, respectively.

Referring to FIG. 6B, the division type core assemblies are assembled on the assembly PCB 50 in sequence of u1-w1-v1-u2-w2-v2-u1-...-u6-w6-v6. In this case, the start wiring lines of the stator core assemblies u1, w1, and v1 are connected with input terminals U, W and V through which drive signals are input, and the end wiring lines of the division type core assemblies u6, w6, and v6 which are located in the sixth stage which is the final stage are mutually connected to form a neutral point (NP).

That is, the drive signals are input into the start wiring lines of the division type core assemblies u1, w1, and v1 from the input terminals U, W and V, and the end wiring lines of the division type core assemblies u6, w6 and v6 of the sixth stage which is the final stage are mutually connected to form a neutral point (NP).

The positive (+) pins that are illustrated in FIG. 6A are start pins 32a which are connected with the start wiring line, and the negative (−) pins that are illustrated in FIG. 6A are end pins 32b which are connected with the end wiring line. In this case, if the end pin 32b of the division type core assembly u1 can be connected with the start wiring line 32a of the division type core assembly u2, it can be seen that the coil is connected by each phase.

As illustrated, the end pin 32b of the division type core assembly u1 is connected with a conduction line 54, and the conduction line 54 is connected with the start pin 32a of the division type core assembly u2. Accordingly, both end portions of the coil 14 of the division type core assemblies u1 and u2 are connected. Here, the conduction line 54 and the start and end pins 32a and 32b can be connected by soldering via jump wires.

In more detail, referring to FIG. 6C, the start wiring lines of the first stage division type core assemblies u1, w1, and v1 are connected with the respective input terminals U, W and V through which the drive signals are input.

In addition, a number of conduction lines 54a-54n are arranged at the central area 52 between the coupling areas 53 of the assembly PCB 50. The end pin 32b of the division type core assembly u1 is connected with one side of the conduction line 54a, and the other side of the conduction line 54a is connected with the start pin 32a of the division type core assembly u2. Thus, the end wiring line of the division type core assembly u1 and the start wiring line of the division type core assembly u2 are connected through the conduction line 54a.

Likewise, the end pins 32b of the division type core assemblies v1-v6 and w1-w6 in V and W phases are connected with the start pins 32a of the division type core assemblies v1-v6 and w1-w6 in a neighboring identical phase.

In addition, the end wiring lines of the sixth stage division type core assemblies u6, w6 and v6 that is the final stage are connected with the final conduction line 54n to thereby form a neutral point (NP).

Since both end portions of the coils 14 between the division type core assemblies 19 in a neighboring identical phase are connected through the respective conduction lines 54 that are arranged at the central area 52 of the assembly PCB 50, the division type coil assemblies 19 are combined on the assembly PCB 50, and both end portions of the coils 14 between the division type core assemblies 19 in an identical phase are easily connected.

As described above, since a connection of the coils 14 between the division type core assemblies 19 is achieved by soldering on the opposing surface through the conduction lines 54 of the assembly PCB 50 in this invention, the winding portion and the connection portion in the division type core 12 may be separated from each other, to thus improve an insulation performance.

An assembly process of the stator 10 of the BLDC motor 1 according to this invention follows. First, each division type stator core 12 is inserted into the hollow portion of the box-type portion of the bobbin 13 and at least one connection pin 32 (for example, 32a and 32b) is inserted into the corners of the flanges 13a and 13b in the bobbin 13.

Thereafter, the coil 14 is wound around the outer circumference between the flanges 13a and 13b of the bobbin 13 which is integrally molded with the division type core 12, using a universal winding machine, to thus prepare a number of division type core assemblies 19.

Then, the number of division type core assemblies 19 are combined on the upper portion of the assembly PCB 50, and both ends of the coil 14 are connected on the bottom of the assembly PCB 50 according to one of the coil connection methods by each phase, to thereby temporarily assemble the stator 10. In addition, the sensor holder 44 is provided on the assembly PCB 50 at the lower portion of the inner yoke 22a. After the Hall sensor 40 has been arranged in the sensor holder 44, the sensor holder 44 is integrated with the stator 10 by an insert-molding method.

Figure 7A:
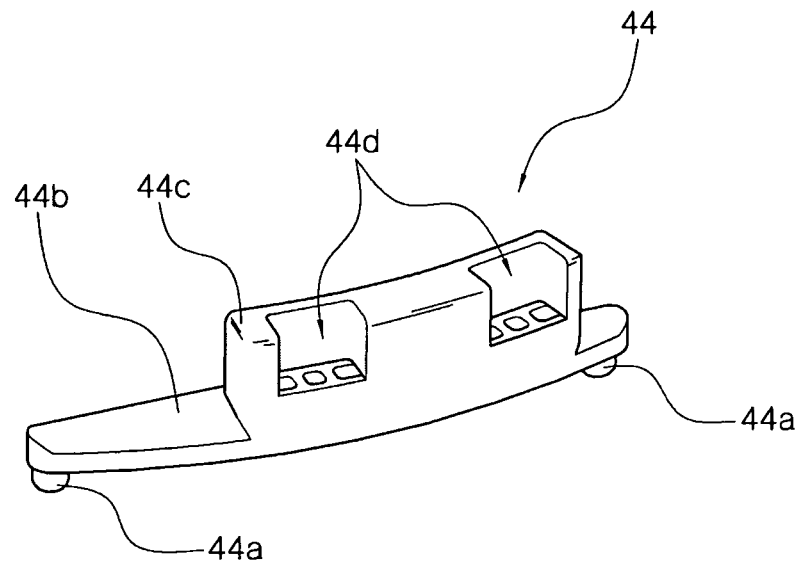
FIGS. 7A and 7B are perspective views for explaining a sensor holder according to the present invention, respectively.
Figure 7B:
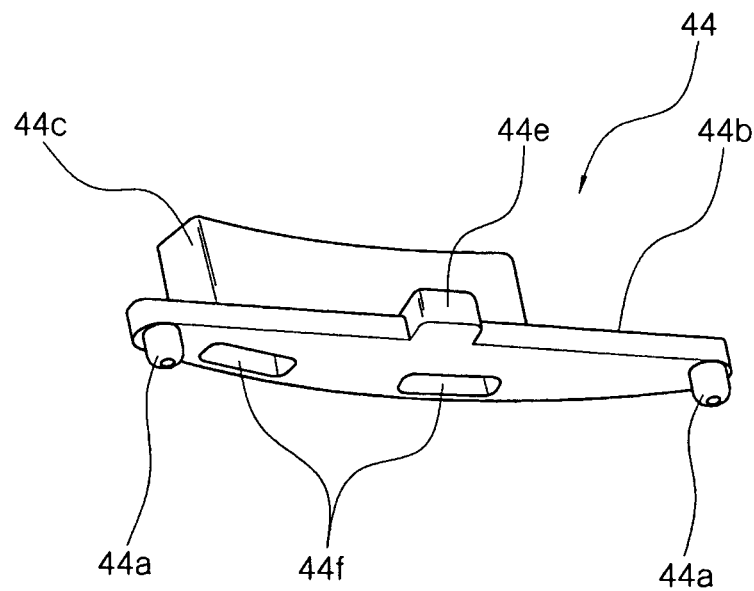

FIGS. 7A and 7B are perspective views for explaining a sensor holder according to the present invention, respectively.

Referring to FIGS. 7A and 7B, a pair of coupling protrusions 44a which are combined with sensor holder coupling holes 56a and 56b of the circuit area 56 of the assembly PCB 50 are formed at the lower portion of the support plate 44b of the sensor holder 44. A sensor coupling unit 44d which can make a pair of Hall sensors 40 combined with and fixed to the housing 44c is formed in the upper portion of the support plate 44b of the sensor holder 44.

In addition, a protrusion 44e which is fitted into a guide groove 56c which is provided in the inner side of the circuit area 56 and guides the coupling of the sensor holder 44, is formed on the lateral surface of the support plate 44b. Connection holes 44f which connect the wiring lines through which a pair of Hall sensors 40 can transmit the detection signals are formed on the support plate 44*b* corresponding to the sensor coupling unit 44*d*.

As stated above, a number of division type core assemblies 19 are assembled on the assembly PCB 50, and then the sensor holder 44 combined with the Hall sensor 40 is combined with the circuit area 56 of assembly PCB 50. Here, the sensor terminal 41 and the signal terminal 42 are combined at the outer side of the stator 10 opposing the sensor holder 44.

A pair of Hall sensors 40 are combined with the sensor coupling unit 44*d* of the sensor holder 44. The signal wiring lines are connected with the circuit area 56 through the connection holes 44*f*. A pair of coupling protrusions 44*a* formed at the lower portion of the support plate 44*b* are fitted and assembled with a pair of sensor coupling holes formed in the circuit area 56 of the assembly PCB 50, so that the Hall sensor 40 is fixedly located on the lower portion of the inner yoke 22*a*.

The sensor holder 44 is combined in the circuit area 56, and both ends of the coil 14 having an identical phase (U, V, W) are mutually connected on the assembly PCB 50 in which a number of division type core assemblies 19 have been assembled. Then, a wiring line is connected in which a detection signal that is generated when the Hall sensor 40 has detected polarity of the inner magnet 24*a* is transferred, through the wiring line. Then, the stator 10 is integrally formed according to an insert-molding method.

Therefore, the sensor holder 44 combined with the Hall sensor 40 is combined with the circuit area 56 of the assembly PCB 50, to thus integrally insert-molded with the stator 10. Accordingly, the Hall sensor 40 can be accurately positioned at a predetermined position. That is, positional bias that may occur in a process of combining the existing Hall sensor 40 to the assembly PCB 50 can be prevented. Thus, the present invention can perform more precise control than the existing method of individually assembling the Hall sensor 40.

Thereafter, the stator 10 is molded by molding the lower surface of the stator 10 with thermosetting resin, for example, a bulk molding compound (BMC) such as polyester, by an insert-molding method, so as to cover a space between the number of division type core assemblies 19 and a coil connection portion located at the lower portion of the assembly PCB 50, except for an external opposing surface of the inner/outer extension portions 12*a* and 12*b* of each division type core 12. Accordingly, the stator 10 shown in FIGS. 4A to 4C is obtained.

Therefore, the BMC molding material contacts in an area where no PCBs are formed except the central area 52, the coupling areas 53 and the circuit area 56 of the assembly PCB 50, to thereby reinforce durability of the stator 10. In addition, the stator 10 is integrally formed through the stator holder 11, to thus enable waterproofing.

Hereinbelow, a division type core that a skew mode is applied in order to offset cogging torque, will be described with reference to FIGS. 8A to 8C.

Figure 8A:
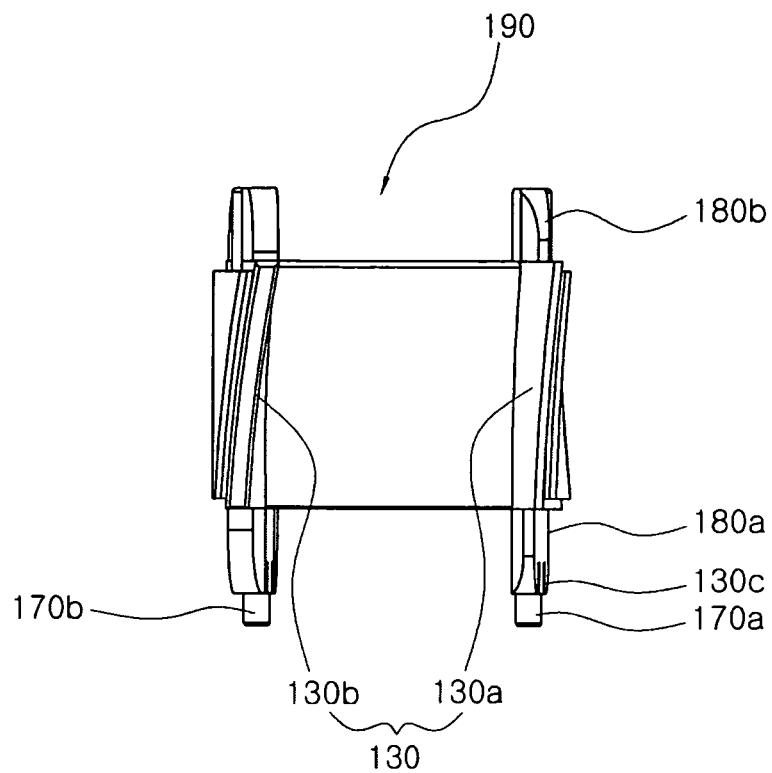
FIG. 8A is a perspective view of a skew division type core in which a skew mode is applied.

FIG. 8A is a perspective view of a skew division type core in which a skew mode is applied. FIG. 8B is a side view of the division type core which is viewed from the inner side. FIG. 8C is a side view of the division type core which is viewed from the outer side.

Figure 8B:
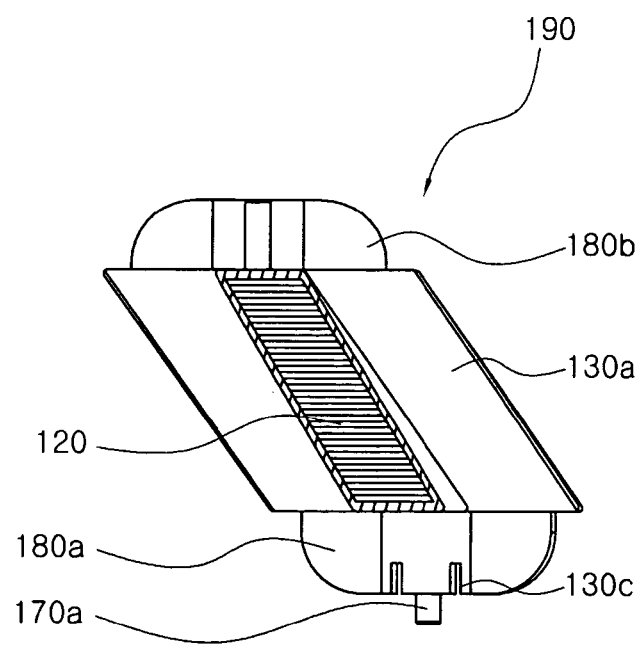
FIG. 8B is a side view of the division type core which is viewed from the inner side.
Figure 8C:
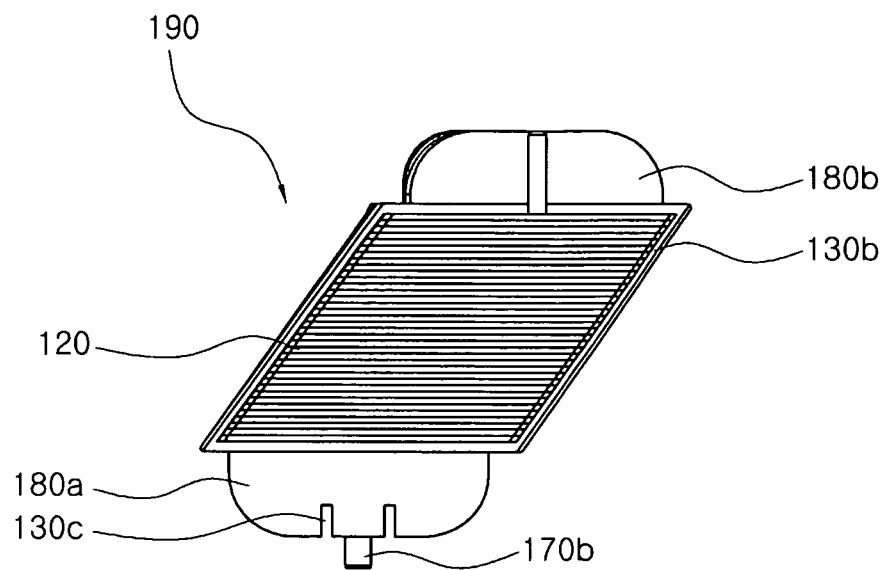
FIG. 8C is a side view of the division type core which is viewed from the outer side.

Referring to FIGS. 8A and 8B, a skew division type core 120 has a cross-section of a substantially I-shaped or T-shaped form. The bobbin 130 including an outer flange 130*a* and an inner flange 130*b* of the insulation material is combined on the outer circumference of the skew division type core 120. The coil is wound around a space provided by the bobbin 130, to thus accomplish a skew division type core assembly 190.

In addition, the outer flange 130*a* of the bobbin 130 is formed in size relatively larger than that of the inner flange 130*b*, and a through-hole 130*c* is provided in order to withdraw a wiring line from the coil wound around the bobbin 130.

The bobbin 130 includes a winding portion of a rectangular box-type shape so that the coil can be wound in the middle of the bobbin 130, and the inner and outer flanges 130*a* and 130*b* that are bent and extended at the inner and outer sides of the winding portion. The coil is wound around the winding portion between the inner and outer flanges 130*a* and 130*b*.

Moreover, flange extension portions 180*a* and 180*b* are extended toward both side surfaces of the inner and outer flanges 130*a* and 130*b*, to thus guide the coil to be wound and make assembly of the division type core assemblies 19 easy.

The through-holes 130*c* are provided in a flange extension portion 180*a* where coupling protrusions 170*a* and 170*b* are formed, and thus drive signals can be input through wiring lines withdrawn of the coil.

The inner and outer flanges 130*a* and 130*b* which are bent and extended from the inner and outer sides of a linearly shaped body of the skew division type core 120, respectively, maintain a predetermined gap with respect to the annular inner and outer rotors 210*a* and 210*b*. For this purpose, the inner flange 130*a* is rounded inwards, and the outer flange 130*b* is rounded outwards. In addition, the stator 10 is generally formed in an annular form. Accordingly, it is desirable that the outer flange 130*b* is formed relatively larger than the inner flange 130.

After the bobbin 130 has been assembled with the skew division type core 120, the coil is wound around the independently perfectly divided skew core 120, respectively, using a universal coil winding machine (not shown).

Further, the first and second coupling protrusions 170*a* and 170*b* which automatically positions the division type core assemblies 190 on the assembly PCB 50 are formed at one side (for example the lower portion thereof) of the inner and outer flanges 130*a* and 130*b*.

A skew can be given to the skew division type core 120, in the range of 0-1 pitch which is determined in inverse proportion to the number of slots (that is, the number of divided cores) so as to obtain an effect of reducing cogging torque and noise/vibration. In this case, one pitch is decided as (360°/the number of slots). For example, one pitch is established as 20.0 in the case that the number of slots is 18.

Therefore, the BLDC motor 1 of the double-rotor/single-stator structure according to this invention does not use an existing 27-core-24-pole structure but an 18-core-12-pole structure, to thereby minimize torque ripple and offset cogging torque which is increased by applying the skew division type core 120.

Figure 9A:
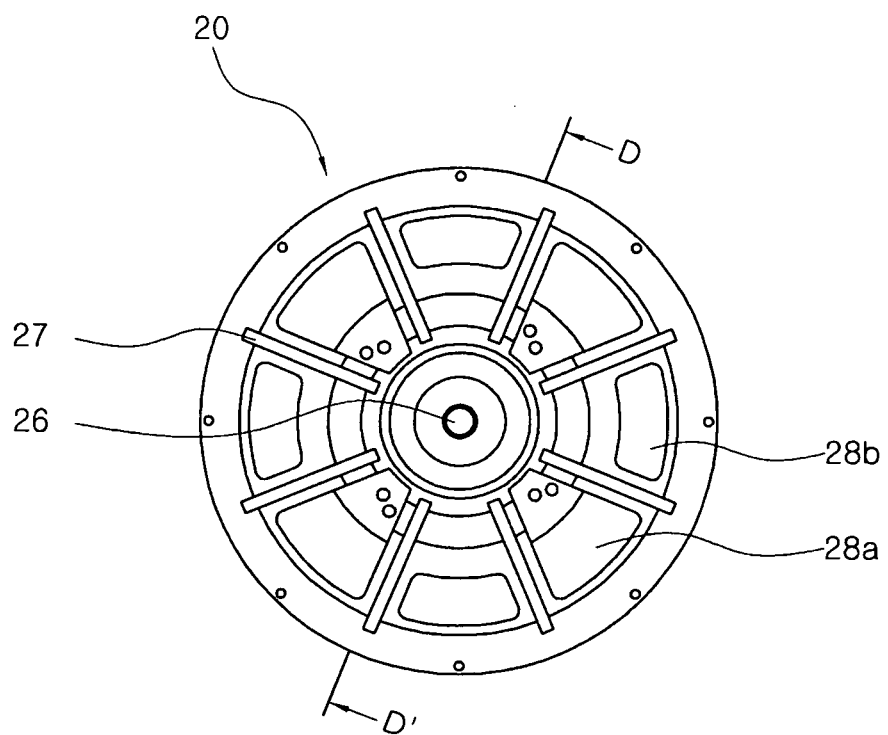
FIG. 9A is a plan view of a double-rotor according to the present invention.
Figure 9B:
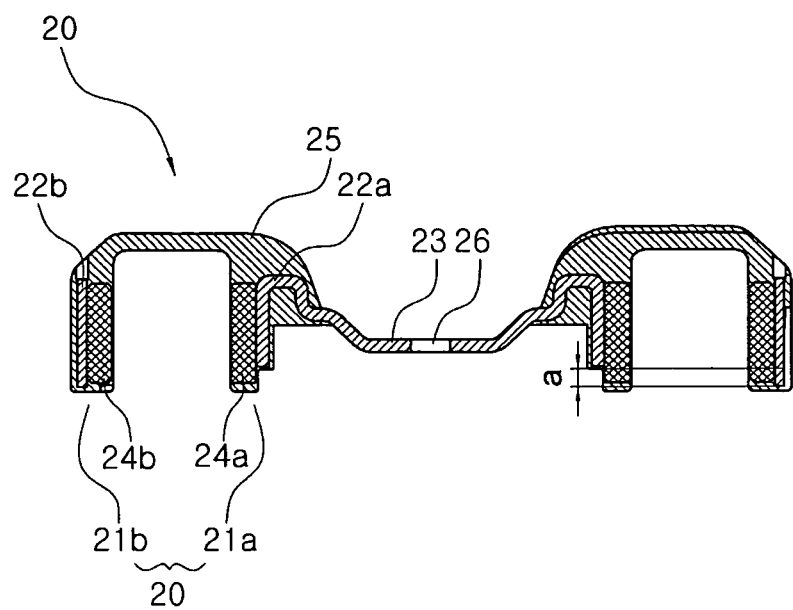
FIG. 9B is a cross-sectional view of the double-rotor which is cut along a line D-D' of FIG. 9A.

FIG. 9A is a plan view of a double-rotor according to the present invention, and FIG. 9B is a cross-sectional view of the double-rotor which is cut along a line D-D' of FIG. 9A.

Referring to FIGS. 9A and 9B, a double-rotor 20 of a BLDC motor 1 includes an outer rotor 21*b* in which a number of outer magnets 24*b* and a ring-shaped outer yoke 22*b* are disposed, and an inner rotor 21*a* in which a number of inner magnets 24*a* and a ring-shaped inner yoke 22*a* which is bent and extended from a rotor support frame 23 are supported and formed by a rotor holder 25.

A central hole 26 through which a rotating axis 30 is inserted to then be combined is formed at the central portion of the rotor support frame 23.

It is desirable that the center of the center hole 26 is positioned at the center of mass of the double-rotor 20. This is to suppress vibration occurring at the time of rotation of the double-rotor 20 at maximum. Therefore, the rotor support frame 23 is bent on the outer circumference thereof, to thus form the inner yoke 22a, so that the center of the center hole 26 is positioned at the center of mass of the double-rotor 20, and is bent on the inner circumference thereof, so that the center of the center hole 26 is positioned at the center of mass of the double-rotor 20.

In the double-rotor 20, a number of, for example, six inner magnets 24a which are respectively magnetized into N-pole and S-pole are alternately disposed in the outer side of the annular inner yoke 22a, using an adhesive, to thereby form the inner rotor 21a, and six outer magnets 24b which are respectively magnetized into N-pole and S-pole are alternately disposed in the inner side of the annular outer yoke 22b, using an adhesive, to thereby form the outer rotor 21b. In this case, the opposing magnets 24a and 24b in the inner and outer rotors 21a and 21b are disposed to have respectively different polarity.

Then, the inner rotor 21a and the outer rotor 21b are insert-molded using thermosetting resin, for example, a bulk molding compound (BMC) molding material, to thereby make the inner rotor 21a and the outer rotor 21b are integrated by the rotor holder 25, to thus manufacture the double-rotor 20.

Here, since the Hall sensor 40 is located at the lower portion of the inner yoke 22a in opposition to the lower portion of the inner magnet 24a, it is desirable that length of the inner yoke 22a is formed shorter by height "a" of the Hall sensor 40 than that of the outer yoke 22b.

In addition, the inner rotor 21a and the outer rotor 21b of the double-rotor 20 are mutually connected through a number of, for example, seven straight line ribs 27 which are radially extended from the central portion thereof. A number of large size holes 28a and small size holes 28b are alternately formed along the circumferential direction at a portion opposing the upper end of the stator 10 by mutually crossing the inner rotor 21a, the outer rotor 21b and the number of the straight line ribs 27.

That is, a number of the large size holes 28a and small size holes 28b are provided in the inner and outer rotors 21a and 21b of the double-rotor 20, in order to guide an air flow from the outside to a magnetic gap direction between the inner and outer rotors 21a and 21b and the stator 10. In addition, a number of the straight line ribs 27 are provided in the inner and outer rotors 21a and 21b of the double-rotor 20, in order to make air flow toward the central hole. Accordingly, the BLDC motor 1 is cooled by air.

Therefore, if the double-rotor 20 is made to rotate, air that goes in through the large size holes 28a and the small size holes 28b goes out through the magnetic gaps G1 and G2 between the inner and outer rotors 21a and 21b and the stator 10. The air flow cools the BLDC motor 1.

In this case, the number of the straight line ribs 27 play a role of reinforcing strength of the stator 10 and play a role of guiding the external air to the large size holes 28a and the small size holes 28b.

That is, heat is generated due to a loss of the electric and magnetic forces from the coil 14 and the magnet 24 by the drive current applied to the coil 14 at the time of driving the BLDC motor 1, and the generated heat is emitted and simultaneously cooled through the above-described air cooling structure of the present invention.

Moreover, since the rotor holder 25 is insert-molded through thermosetting resin, various types of the large size and small size holes 28 and various shapes of ribs 27 may be embodied.

Meanwhile, in the double-rotor 20 of the BLDC motor 1 according to this invention, the frames of the inner yoke 22a and the outer yoke 22b that constitute the inner rotor 21a and the outer rotor 21b are bent and formed, respectively. Then, the magnets 24 are arranged on the outer circumference of the inner yoke 22a and inner circumference of the outer yoke 22b, so as to oppose each other and have a reverse polarity with respect to each other. In this manner, the double-rotor 20 may be formed in a double structure of coupling the respective frames. Otherwise, the double-rotor 20 may be formed by various kinds of the other known methods.

As stated above, if the driving device for the washing machine is implemented using the BLDC motor 1 of the double-rotor/single-stator structure according to the present invention, the stator 10 of the BLDC motor 1 is integrally formed by the stator holder 11, and the double-rotor 20 is integrally formed by the rotor holder 25. Accordingly, the driving device for the washing machine may be formed in a waterproofing structure, and assembled in a modular form on the assembly PCB 50, to thereby enhance productivity.

Moreover, a contact area of a bulk molding compound (BMC) molding material (for example, thermosetting resin) which forms an integral type stator is maximized and a contact area between the BMC molding material which forms a rotor holder of the double-rotor and the inner yoke is maximized in the BLDC motor of the double-rotor/single-stator structure applied for the driving device of the full automatic washing machine, to thus enhance durability of the BLDC motor.

In addition, as described above, in the case of the driving device for the washing machine according to this invention, the first wash axis 81 combined at the center of the double-rotor 20 of the BLDC motor 1 is connected with the second wash axis 82 that rotates the pulsator 106 through the sun gear 125 of the gear unit 120, and the first dehydration axis 91 and the second dehydration axis 92 are connected through the drum 121 of the gear unit 120. Accordingly, the dehydration axis 91 and 92 and the wash axes 81 and 82 can be combined through the gear unit 120 so as to rotate without a special coupling structure.

Moreover, the washing machine according to this invention controls rotation of the first dehydration axis 91 through the clutch unit 130 at the wash stroke, and cancels the control of rotation of the first dehydration axis 91 at the dehydration stroke. Accordingly, the washing machine according to this invention can control rotation of the dehydration axes 91 and 92 that rotate the inner tub 100 at the wash stroke without having a special brake assembly.

Furthermore, the washing machine according to this invention makes the clutch gear 163 closely adhered to the first dehydration axis 91, to thereby control rotation of the inner tub 100, and to thus perform a wash or dehydration stroke. Accordingly, a coupling structure of the wash axis and the dehydration axis is simplified to thus enhance productivity and prevent breakdown due to complexity of the coupling structure.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

INDUSTRIAL APPLICABILITY

As described above, the present invention provides a driving device of an automatic washing machine which can control rotation of a dehydration axis at a wash stroke without a special brake unit, and also has a simple clutch coupling structure and a simple rotary coupling structure of a wash axis and a dehydration axis. Thus, the present invention can be applied to a full automatic washing machine.

In addition, this invention provides a BLDC motor in which a double-rotor and a stator are insert-molded using a BMC molding material to thus become waterproof and to maximize a contact area of the BMC molding material to enhance durability. This can be applied to a driving device of a full automatic washing machine.

The invention claimed is:

1. A driving device for a full automatic washing machine having an inner tub and a pulsator rotatably combined in the inner tub, the driving device comprising:
 a brushless direct-current (BLDC) motor that produces a rotational force that rotates the pulsator and the inner tub, the BLDC motor includes a double-rotor having inner and outer rotors, a number of N-pole and S-pole magnets arranged on the outer circumference of an inner yoke and the inner circumference of an outer yoke, opposing magnets being arranged to have a reverse polarity; and
 an integral type stator having an annular contour and installed with a mutual gap between the inner and outer rotors, the stator including:
  a plurality of stator core assemblies, each stator core assembly including a division type stator core, a bobbin received on the division type stator core and a coil wound on the bobbin, each bobbin having inner and outer flanges having first and second coupling protrusions respectively formed thereon at lower-center portions of the inner and outer flanges;
  a sensor holder combined with a plurality of Hall sensors mounted therein, the sensor holder having multiple coupling protrusions extending from a bottom thereof;
  a printed circuit board (PCB) having the plurality of stator core assemblies mounted thereon, the PCB having an annular central area with a number of conduction lines printed on a surface thereof to connect the coils of the plurality of stator core assemblies to a respective electrical phase of a three phase circuit arrangement and a circuit area having multiple sensor holder coupling holes for receiving the multiple coupling protrusions respectively to thereby position the Hall sensors at a lower portion of the inner yoke, the PCB further including a plurality of coupling areas each extending radially from an opposing inner and outer side of the central area to define transverse projections therefrom, each coupling area being smaller in area than an area of a lower end of a corresponding one of the plurality of stator core assemblies, wherein the PCB is integrally formed with the stator core assemblies by a thermosetting resin to form a stator PCB assembly, and wherein each coupling area has first and second coupling grooves formed therein for receiving the first and second coupling protrusions of the bobbin of a corresponding one of the stator core assemblies; and
  a stator holder integrally formed with the stator PCB assembly by insert-molding;
 a first wash axle fixedly combined with a rotor support frame that is extended from the double rotor of the BLDC motor so as to rotate;
 a second wash axle having one side is linked with the pulsator, and through the other side receiving the rotational force from the first wash axle, to make the pulsator rotate in a forward/reverse direction;
 a first dehydration axle coaxially combined on the outer circumference of the first wash axle, and affixed to the rotor support frame so as to rotate;
 a second dehydration axle having one side is connected with the inner tub, and through the other side receiving the rotational force from the first dehydration axle, to make the inner tub rotate;
 a gear unit transferring the rotational force between the first dehydration axle and the second dehydration axle and between the first wash axle and the second wash axle; and
 a clutch unit controlling rotation of the first dehydration axle at a wash stroke to thus make the rotational force generated from the BLDC motor transferred from the first wash axle to the second wash axle so as to make the pulsator rotate, and making the first dehydration axle rotatable at a dehydration stroke to thereby make the rotational force generated from the BLDC motor transferred to the second wash axle and the second dehydration axle through the gear unit, to thereby make the pulsator and the inner tub rotate simultaneously.

2. The driving device of claim 1, wherein the gear unit comprises:
 a drum that connects the first dehydration axle and the second dehydration axle mutually, and forms an external shape of the gear unit;
 a sun gear linked with the first wash axle;
 a number of planetary gears which are engaged with the sun gear to rotate;
 a gear axle which becomes a center of rotation when the planetary gears are engaged with the sun gear; and
 a carrier which supports the upper/lower portions of the gear axle, and which is connected with the second wash axle,
 wherein rotation of the first dehydration axle is controlled at the wash stroke, to thus make the drum fixed and transfer the rotational force transferred by the planetary gears which are engaged with the sun gear to then rotate is transferred to the second wash axle through the carrier, and wherein the first dehydration axle is supported to the BLDC motor to then rotate at a dehydration stroke, and to thereby make the drum rotate and the rotational force is transferred to the second dehydration axle and the second wash axle.

3. The driving device of claim 2, wherein the clutch unit comprises:
 a clutch housing that encloses and protects the drum, and is fixedly combined with the stator of the BLDC motor;
 a bushing that makes the first dehydration axle supported to the rotor support frame, and makes the first dehydration axle rotatable according to the rotational force that is generated from the BLDC motor;
 a clutch gear located at an outer side surface of both a part of the first dehydration axle and a portion the bushing;

a clutch lever that moves to a first direction at the wash stroke, and moves to a second direction at the dehydration stroke; and a clutch coupler that is combined with the clutch gear, when the clutch lever moves to the first direction, and that is seceded from the clutch gear, when the clutch lever moves to the second direction, wherein the clutch coupler is closely adhered to the first dehydration axle to thus control rotation of the first dehydration axle when the clutch coupler is combined with the clutch gear, and the first dehydration axle is rotatably set when the clutch coupler is seceded from the clutch gear.

4. The driving device of claim 3, further comprising:

a torsion spring which is located between the bushing and the clutch gear, wherein the torsion spring is closely adhered to the bushing and the first dehydration axle, when the clutch coupler is combined to the clutch gear, the torsion spring adds a torsion force in opposition to a rotational force in the first direction that controls rotation of the first dehydration axle to thereby fixedly tighten the bushing.

5. The driving device of claim 3, further comprising:

a first and second sleeve bearings respectively supporting rotation of the first wash axle and the second wash axle, and each having a central axis located coaxially with a central axis of the first and second wash axles;

the first sleeve bearing is located between the first wash axle and the first dehydration axle and supports rotation of the first dehydration axle; and the second sleeve bearing is located between the second wash axle and the second dehydration axle and supports rotation of the second dehydration axle.

6. The driving device of claim 1, wherein the stator holder comprises:

an extension portion which extends radially, and fixes the integral type stator to a clutch housing of the clutch unit; and a number of support strength reinforcement ribs for reinforcing strength of the stator, which are formed on the outer circumference thereof.

7. The driving device of claim 1, wherein the BLDC motor is formed of a 18-core-24-pole structure, and skew is applied to the division type cores within one pitch range which is defined as 360°/the number of cores, and wherein the stator is configured so that eighteen division type core assemblies are combined on the PCB in the three phase circuit arrangement, six of the eighteen division type core assemblies being connected to a respective one of the three phases, a respective start wiring line of a first of the six division type core assemblies of each phase is connected to driving signals, the six division type core assemblies of each phase are connected in series, and end wiring lines of each sixth of the six division type core assemblies are connected with each other to form neutral point.

8. The driving device of claim 1, wherein the BLDC motor is of a structure of a double-rotor/single-stator type.

9. The driving device of claim 8, wherein the stator of the BLDC motor comprises a number of division type cores, and wherein skew is applied to the division type cores within one pitch range which is defined as 360°/the number of cores.

* * * * *